United States Patent
Ishigaki et al.

(10) Patent No.: US 8,142,946 B2
(45) Date of Patent: Mar. 27, 2012

(54) FUEL CELL SYSTEM

(75) Inventors: Katsuki Ishigaki, Handa (JP); Hironori Noto, Tokai (JP); Takashi Yamamoto, Okazaki (JP); Masataka Ota, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1295 days.

(21) Appl. No.: 11/792,780

(22) PCT Filed: Dec. 14, 2005

(86) PCT No.: PCT/JP2005/023422
§ 371 (c)(1),
(2), (4) Date: Jun. 11, 2007

(87) PCT Pub. No.: WO2006/064955
PCT Pub. Date: Jun. 22, 2006

(65) Prior Publication Data
US 2007/0298298 A1    Dec. 27, 2007

(30) Foreign Application Priority Data

Dec. 15, 2004 (JP) .................................. 2004-363040
Dec. 22, 2004 (JP) .................................. 2004-370436

(51) Int. Cl.
*H01M 8/04* (2006.01)
(52) U.S. Cl. ......... 429/429; 429/434; 429/439; 429/440
(58) Field of Classification Search .................. 429/412, 429/413, 414, 425, 434, 429, 439, 440
See application file for complete search history.

(56) References Cited

U.S. PATENT DOCUMENTS

| | | | |
|---|---|---|---|
| 3,539,397 A | 11/1970 | Keating, Jr. et al. | |
| 6,096,448 A | 8/2000 | Wilkinson et al. | |
| 2001/0018832 A1* | 9/2001 | Matsunaga et al. | 62/239 |
| 2004/0209135 A1* | 10/2004 | Wexel et al. | 429/26 |
| 2004/0265654 A1* | 12/2004 | Imaseki et al. | 429/13 |
| 2005/0103033 A1* | 5/2005 | Schwartz et al. | 62/185 |
| 2008/0032168 A1 | 2/2008 | Fujita | |
| 2010/0127710 A1 | 5/2010 | Hasegawa et al. | |

FOREIGN PATENT DOCUMENTS

| | | |
|---|---|---|
| JP | 2001-167779 A | 6/2001 |
| JP | 2001-315524 A | 11/2001 |
| JP | 2002-266640 A | 9/2002 |
| JP | 2003-036874 A | 2/2003 |
| JP | 2003-109637 A | 4/2003 |
| JP | WO03/037666 A1 * | 5/2003 |
| JP | 2004-158279 A | 6/2004 |
| JP | 2004-247096 A | 9/2004 |
| JP | 2004-345426 A | 12/2004 |
| JP | 2005-005087 A | 1/2005 |

* cited by examiner

*Primary Examiner* — Patrick Ryan
*Assistant Examiner* — Alex Usyatinsky
(74) *Attorney, Agent, or Firm* — Kenyon & Kenyon LLP

(57) ABSTRACT

Disclosed is a fuel cell system capable of restraining a temperature change in a fuel cell caused by a refrigerant. The fuel cell system has a refrigerant circulating system for circulating the refrigerant from the fuel cell to the fuel cell. The refrigerant circulating system has flow control means for restraining the inflow of the refrigerant, which has a predetermined difference in temperature from that of the fuel cell, into the fuel cell.

19 Claims, 18 Drawing Sheets

FIG.13
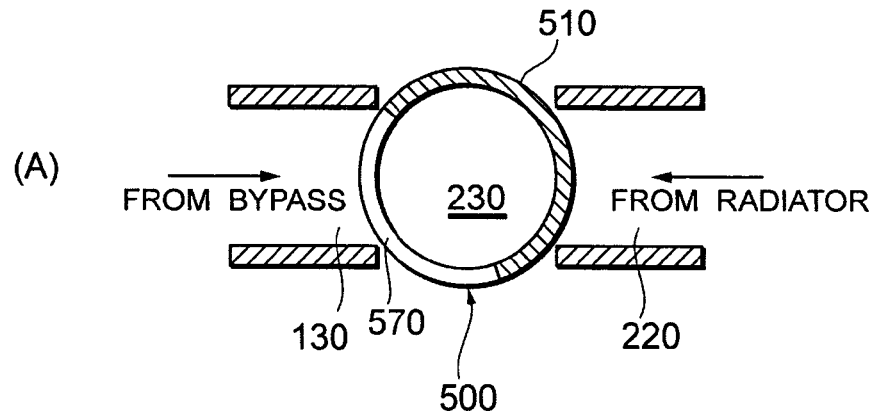
(A)
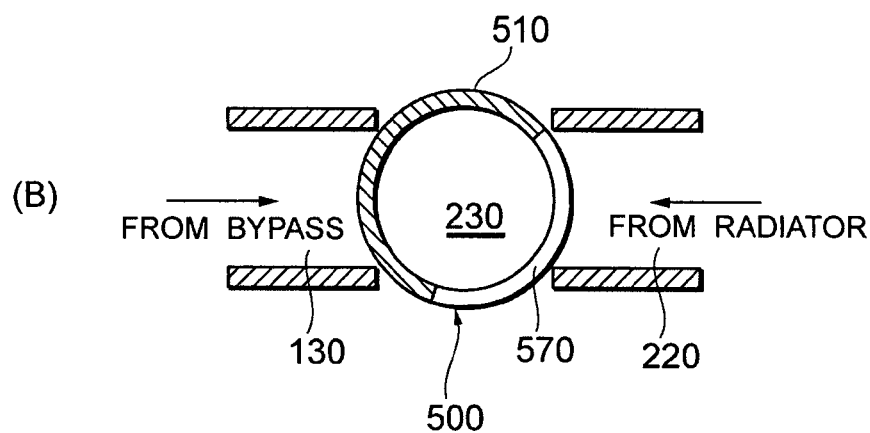
(B)
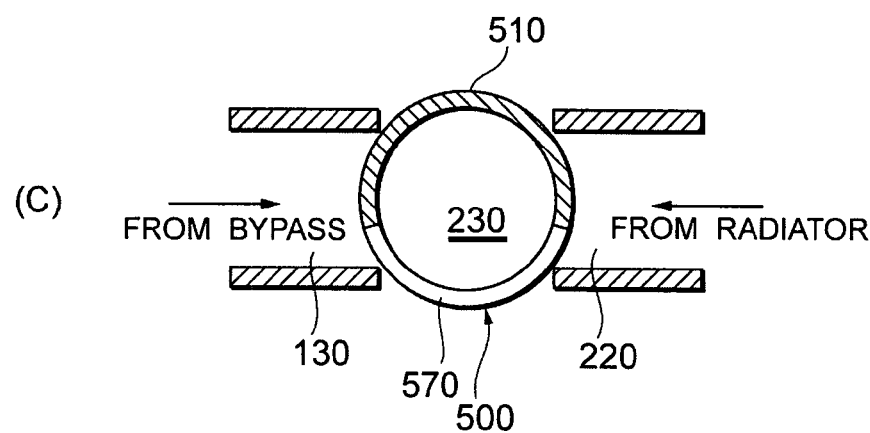
(C)

FUEL CELL SYSTEM

This is a 371 national phase application of PCT/JP2005/023422 filed 14 Dec. 2005, claiming priority to Japanese Patent Application No. 2004-363040 filed 15 Dec. 2004, and No. 2004-370436 filed 22 Dec. 2004, respectively, the contents of which are incorporated herein by reference.

TECHNICAL FIELD

The present invention relates to a fuel cell system which circulates a refrigerant to cool a fuel cell.

BACKGROUND ART

An electrochemical reaction of a fuel cell is an exothermic reaction. To maintain the temperature of the fuel cell at a constant level when generating electric power, a fuel cell system has a cooling apparatus for the fuel cell (refer to, for example, Patent Document 1).

The cooling apparatus has a circulation passage through which a refrigerant is circulated between the fuel cell and a radiator by a pump, a bypass passage for bypassing the radiator, and a thermostat valve for switching between the radiator and the bypass passage when circulating the refrigerant. The thermostat valve performs a switching operation based on the temperature of the refrigerant flowing through the thermostat valve. Further, the cooling apparatus houses the fuel cell, the bypass passage, and the thermostat valve in a single case so as to restrain heat dissipation of the refrigerant when the fuel cell warms up (starts up).

Further, there has also been known a fuel cell system that uses a refrigerant that has passed through a fuel cell as a heat source for air conditioning. For instance, the fuel cell system described in Patent Document 2 is mounted in a fuel cell car, and the exhaust heat of the refrigerant that has passed through the fuel cell is used for heating the interior of the car. The fuel cell system has a cooling line having a radiator and an exhaust heat utilization line having a heater core capable of heat-exchanging the refrigerant with air-conditioning gas, as the lines for circulating the refrigerant to the fuel cell (refrigerant circulation system). If there is a demand for heating the interior of the car, then the refrigerant flows in the cooling line and the exhaust heat utilization line. This causes the refrigerant that has passed through the radiator and the refrigerant that has passed through the heater core to merge and flow into the fuel cell.

[Patent Document 1] Japanese Unexamined Patent Application Publication No. 2004-158279 (Page 4 and FIG. 1)
[Patent Document 2] Japanese Unexamined Patent Application Publication No. 2001-315524 (FIG. 1)

DISCLOSURE OF INVENTION

The fuel cell system in Patent Document 1 assumes that the temperature of the refrigerant is low when starting-up the fuel cell. Hence, when starting-up the fuel cell, the low-temperature refrigerant causes the thermostat valve to be switched to the bypass passage, while the pump is driven at this time. Then, when the temperature of the refrigerant rises to a relatively high degree as the fuel cell generates electric power, the thermostat valve switches to the radiator side.

However, there is a case where the temperature of refrigerant is high even when starting-up the fuel cell. To be more specific, in a short time following a stop of the fuel cell, there is a difference in the radiation amount of the refrigerant between the fuel cell inside the case and the radiator outside the case. For this reason, a refrigerant of a relatively high temperature exists in the fuel cell, while a refrigerant of a relatively low temperature exists in the radiator.

If the fuel cell is restarted with a considerable temperature difference between the two, then the refrigerant of the relatively high temperature in the fuel cell flows into the thermostat valve. This causes the thermostat valve to be undesirably switched to the radiator, leading to a possibility of a situation against original specifications. Furthermore, when the thermostat valve switches to the radiator, the refrigerant of the relatively low temperature in the radiator flows into the fuel cell. This causes a sudden temperature change in the fuel cell. As a result, the fuel cell is subjected to a thermal shock, leading to a potential of distortion of a separator of the fuel cell.

Thus, the conventional cooling apparatus for the fuel cell has not been designed to implement the setting of an opening degree, including the switching of a fluidic valve (thermostat valve), by taking a restart-up of the fuel cell into account. Furthermore, there has been a potential of the fuel cell being adversely affected due to temperature changes, because refrigerant flows (the pump is driven) under a condition in which the fluidic valve is set to an out-of-specification opening degree.

Meanwhile, the fuel cell system in Patent Document 2 circulates the refrigerant that has passed only through the cooling line into the fuel cell if there is no demand for heating. In this case, the temperature of the refrigerant in the exhaust heat utilization line remains unchanged and thus remains lower than the temperature of the refrigerant in the cooling line. Here, if there is a demand for heating after the operation of the fuel cell system is stopped once and then restarted, the refrigerant of the relatively low temperature in the exhaust heat utilization line flows into the fuel cell wherein the refrigerant of the relatively high temperature remains. This causes a sudden temperature change in the fuel cell. As a result, the fuel cell is subjected to a thermal shock and hence, there has been a potential in that the fuel cell is adversely affected due to the temperature change, represented by, for example, distortion of a separator of the fuel cell or the occurrence of flooding attributable to condensed water vapor.

It is an object of the present invention to provide a fuel cell system capable of restraining a temperature change in a fuel cell attributable to a refrigerant.

Specifically, an object of the present invention is to provide a fuel cell system capable of restraining the temperature change in the fuel cell attributable to the refrigerant in an exhaust heat utilization line and to provide a fuel cell system (a cooling apparatus for a fuel cell) capable of restraining the temperature change in the fuel cell when starting-up the fuel cell.

To attain the aforesaid object, a fuel cell system in accordance with the present invention is a fuel cell system provided with a refrigerant circulating system for circulatively supplying a refrigerant to a fuel cell. The refrigerant circulating system has a flow control means for restraining a refrigerant having a predetermined temperature difference from the fuel cell from flowing into the fuel cell.

This configuration restrains a refrigerant having a predetermined temperature difference from the fuel cell from flowing into the fuel cell, thus making it possible to restrain a temperature change in the fuel cell attributable to the refrigerant. This protects the fuel cell from a thermal shock.

To attain the object, a fuel cell system in accordance with the present invention is a fuel cell system which cools a fuel cell by circulating a refrigerant that passes through the fuel cell and which is capable of heating air-conditioning gas in an air-conditioning line by exhaust heat of the refrigerant that has passed through the fuel cell. The fuel cell system includes a cooling line which has a first heat exchanger for cooling a refrigerant and circulates the refrigerant to the fuel cell; an exhaust heat utilization line which has a second heat exchanger for heat-exchanging a refrigerant with the air-conditioning gas in the air-conditioning line and which circulates the refrigerant to the fuel cell; and flow control means for controlling the flow of the refrigerant in the cooling line and the exhaust heat utilization line. The flow control means starts the flow of the refrigerant in the exhaust heat utilization line after starting the flow of the refrigerant in the cooling line.

With this configuration, the flow of the refrigerant in the exhaust heat utilization line is delayed from the flow of the refrigerant in the cooling line, so that the refrigerant that is started to flow into the fuel cell is the refrigerant of the cooling line. This makes it possible to restrain a temperature change in the fuel cell even if there is a significant temperature difference in the refrigerant between the cooling line (fuel cell) and the exhaust heat utilization line. In particular, if the flow of the refrigerant in the exhaust heat utilization line is started after the flow rate of the refrigerant in the cooling line has adequately increased, a temperature change in the fuel cell can be ideally restrained. If setting is made such that, when starting the flow of the refrigerant in the exhaust heat utilization line, the flow rate thereof is gradually increased, then a temperature change in the fuel cell can be further ideally restrained.

Preferably, the fuel cell system further includes input means that enables a user to input an instruction for blowing in air-conditioning gas of the air-conditioning line. The flow control means controls the flow of the refrigerant in the cooling line and the exhaust heat utilization line based on an input result of the input means.

This configuration allows the refrigerant to properly flow in the cooling line and the exhaust heat utilization line according to user's demand for heating.

Preferably, the flow control means starts the flow of refrigerant in the cooling line preferentially over the flow in the exhaust heat utilization line if there is an input to the input means. If there is no input to the input means, the flow of the refrigerant in the exhaust heat utilization line may be shut off, while the refrigerant is allowed to flow in the cooling line.

With this configuration, when an input is supplied to the input means by a user to use heating, the refrigerant starts to flow in the cooling line preferentially over the exhaust heat utilization line, so that a temperature change in the fuel cell can be restrained, as described above. If the user does not use heating and therefore no input is supplied to the input means, then the refrigerant does not flow in the exhaust heat utilization line, so that air-conditioning gas is not heated and the fuel cell can be properly cooled by the refrigerant flowing in the cooling line.

Preferably, when starting-up the fuel cell, the flow control means starts the flow of the refrigerant in the exhaust heat utilization line after the flow of the refrigerant in the cooling line begins and allows the refrigerant to flow for a predetermined time in the exhaust heat utilization line even if no input is supplied to the input means.

For example, during the summer, if heating is used with a low frequency and heating is not used for a long period of time, then the refrigerant in the exhaust heat utilization line may become stagnant therein. This leads to a possibility of problems, such as foreign matters building up or algae growing in the exhaust heat utilization line. According to the aforesaid construction, the refrigerant in the exhaust heat utilization line is caused to flow once when starting-up the fuel cell, thus making it possible to properly obviate the aforesaid problems regardless of the demand for heating. Moreover, the timing for causing the refrigerant to flow in the exhaust heat utilization line is set to the instant the fuel cell is started up, so that the control can be simplified, as compared with a case where the control is carried out when operating the fuel cell.

Preferably, when starting-up the fuel cell, the flow control means starts the flow of the refrigerant in the exhaust heat utilization line after starting the flow of the refrigerant in the cooling line.

With this configuration, a temperature change in the fuel cell caused by the refrigerant in the exhaust heat utilization line can be restrained at a start-up (at a restart-up described above) of the fuel cell when the difference in refrigerant temperature between the cooling line (fuel cell) and the exhaust heat utilization line tends to increase. In addition, problems due to the refrigerant stagnating in the exhaust heat utilization line can be obviated with good controllability.

Preferably, the fuel cell system further includes timer means for measuring time from a stop of the fuel cell to the next start. The flow control means varies start time, at which the flow of the refrigerant in the exhaust heat utilization line is begun when starting-up the fuel cell, on the basis of a measurement result of the timer means.

This makes it possible to vary the start time, at which the flow of the refrigerant in the exhaust heat utilization line is begun, according to the stop time (the left-alone time at a stop) of the fuel cell. Thus, if, for example, the stop time is relatively long, then the flows of the refrigerants in the exhaust heat utilization line and the cooling line can be simultaneously begun. If the stop time is relatively short, then the start of the flow of the refrigerant in the exhaust heat utilization line can be sufficiently delayed from that in the cooling line.

According to a preferable embodiment, the fuel cell system further includes a temperature sensor for detecting the temperature of a refrigerant, wherein the flow control means varies the start time, at which the flow of the refrigerant in the exhaust heat utilization line is begun when starting-up the fuel cell, on the basis of a detection result of the temperature sensor.

With this configuration, the start time, at which the flow of the refrigerant in the exhaust heat utilization line is begun, can be varied according to the temperature of the refrigerant. This makes it possible to ideally restrain a temperature change in the fuel cell. Temperature sensors are preferably provided at a plurality of locations, e.g., in both the cooling line and the exhaust heat utilization line.

Preferably, the flow control means causes the refrigerant to flow in at least one of the cooling line and the exhaust heat utilization line while the fuel cell is being intermittently operated.

Here, the intermittent operation of the fuel cell means that the supply of power to a load from the fuel cell is temporarily stopped and power is supplied to the load from a secondary cell. The intermittent operation is accomplished by intermittently (intermissively) supplying fuel gas and oxidant gas to the fuel cell to maintain an open end voltage of the fuel cell within a predetermined range.

The aforesaid configuration allows the refrigerant to flow through the fuel cell during the intermittent operation. In other words, the temperature of the fuel cell can be properly controlled since the flow of the refrigerant into the fuel cell can be continued during the intermittent operation.

Preferably, the flow control means starts the flow of the refrigerant in the cooling line preferentially over the flow in the exhaust heat utilization line when the fuel cell is intermittently operated.

With this configuration, if the refrigerant in the exhaust heat utilization line is caused to flow during the intermittent operation, then the refrigerant in the cooling line can be started to flow first. This makes it possible to ideally restrain a temperature change in the fuel cell during the intermittent operation.

Preferably, when stopping the fuel cell, the flow control means stops the flow in the exhaust heat utilization line preferentially over the flow of the refrigerant in the cooling line.

With this configuration, as described above, if the refrigerants in the exhaust heat utilization line and the cooling line are flowing when the fuel cell is stopped, then the flow of the refrigerant in the exhaust heat utilization line can be stopped first. This makes it possible to ideally restrain a temperature change in the fuel cell at the time of stopping.

Preferably, the flow control means includes a cooling pump for pressure-feeding a refrigerant in the cooling line, an exhaust heat utilization pump for pressure-feeding a refrigerant in the exhaust heat utilization line, and control means for controlling the driving of the cooling pump and the exhaust heat utilization pump. The control means starts the driving of the cooling pump and then starts the driving of the exhaust heat utilization pump.

This configuration includes the separate pumps for the cooling line and the exhaust heat utilization line, thus allowing the flow of the refrigerant in each line to be properly controlled. Further, controlling the driving start timings by coordinating the two pumps makes it possible to start the flow of the refrigerant in the exhaust heat utilization line after starting the flow of the refrigerant in the cooling line described above.

Preferably, the control means carries out flow rate control such that the flow rate of the refrigerant by the cooling pump is larger than the flow rate of the refrigerant by the exhaust heat utilization pump.

This configuration allows the flow rate control by the pumps to start the flow of the refrigerant in the exhaust heat utilization line after the flow rate of the refrigerant in the cooling line has sufficiently increased, thus permitting ideal restraint of a temperature change in the fuel cell. This type of flow rate control includes the control of the number of revolutions of a pump and the control of duty ratio.

Preferably, the fuel cell system further includes a temperature sensor for detecting the temperature of a refrigerant. The control means controls the driving of the cooling pump and the exhaust heat utilization pump on the basis of a detection result of the temperature sensor.

With this configuration, a drive condition of each pump can be changed according to the temperature of a refrigerant. This makes it possible to simultaneously start the driving of the pumps if, for example, there is no temperature difference between the cooling line and the exhaust heat utilization line. Temperature sensors are preferably provided at a plurality of locations, and preferably provided on, for example, both the cooling line and the exhaust heat utilization line.

Preferably, the exhaust heat utilization line is connected to the point of branching from and the point of merging with the cooling line at the refrigerant outlet side of the fuel cell. The cooling line on the upstream side beyond the point of merging is provided with a check valve for blocking the flow of the refrigerant from the point of merging to the refrigerant outlet of the fuel cell.

This configuration makes it possible to block the refrigerant flowing in the exhaust heat utilization line from flowing to the refrigerant outlet of the fuel cell. Thus, even if the temperature of the refrigerant in the exhaust heat utilization line is lower than the temperature of the fuel cell, the fuel cell will not be subjected to a temperature change.

According to a preferable embodiment, the flow control means includes a single pump for pressure-feeding the refrigerant in the cooling line and the exhaust heat utilization line, and control means for controlling the driving of the pump. The passage resistance in the cooling line may be set to be lower than the passage resistance in the exhaust heat utilization line, so that the refrigerant of the cooling line starts to flow into the fuel cell preferentially over the refrigerant of the exhaust heat utilization line.

This configuration makes it possible to reduce the number of the pumps by one, as compared with the configuration described above, thus simplifying the pump control by the control means. The single pump pressure-feeds the refrigerant in both the cooling line and the exhaust heat utilization line, making it possible to start the flow of the refrigerant in the cooling line preferentially over the exhaust heat utilization line by setting the passage resistances of the two lines as described above.

Here, to accomplish pressure drop tuning for setting channel resistance, for example, the tube diameter of the exhaust heat utilization line may be set to be sufficiently smaller than the tube diameter of the cooling line. Alternatively, a throttling part, such as an orifice, for making it difficult for the refrigerant to flow through may be provided at some midpoint in the exhaust heat utilization line.

According to a preferred embodiment, the flow control means includes a single pump for pressure-feeding a refrigerant in the cooling line and the exhaust heat utilization line, a switching valve for switching the flow of the refrigerant of the cooling line and the exhaust heat utilization line to the fuel cell, and control means for controlling the driving of the pump and the switching valve. To start the flow of the refrigerant of the exhaust heat utilization line to the fuel cell, the control means may switch the switching valve to the cooling line to start the flow of the refrigerant of the cooling line to the fuel cell.

With this configuration, the flow of the refrigerant of the cooling line to the fuel cell can be preferentially started over the exhaust heat utilization line by controlling the switching valve without depending on the pressure drop tuning of the cooling line and the exhaust heat utilization line.

Preferably, the cooling line and the exhaust heat utilization line are provided with confluences for merging refrigerants at a refrigerant inlet side of the fuel cell and also with branch points for splitting the refrigerant at a refrigerant outlet side of the fuel cell.

With this configuration, the refrigerant branches at the outlet side of the fuel cell and flows into the cooling line and the exhaust heat utilization line and then merges again at the inlet side of the fuel cell to go into the fuel cell.

To attain the aforesaid object, another fuel cell system in accordance with the present invention is a fuel cell system which cools a fuel cell by circulating a refrigerant that flows into the fuel cell and which is capable of heating air-conditioning gas in an air-conditioning line by exhaust heat of the refrigerant that has passed through the fuel cell, comprising: a cooling line which has a first heat exchanger for cooling a refrigerant and circulates the refrigerant to the fuel cell; an exhaust heat utilization line which has a second heat exchanger for heat-exchanging a refrigerant with the air-conditioning gas in the air-conditioning line and which circulates the refrigerant to the fuel cell; and flow control means for controlling the flow of the refrigerant in the cooling line and the exhaust heat utilization line. The flow control means carries out flow rate control such that the flow rate of the refrigerant of the cooling line is larger than that of the exhaust heat utilization line when the refrigerants of the cooling line and the exhaust heat utilization line are merged and moved into the fuel cell.

With this configuration, even if there is a temperature difference in refrigerant between the cooling line (fuel cell) and the exhaust heat utilization line, the temperature of the refrigerant resulting from the merging of the refrigerants of the two lines will be close to a temperature of the refrigerant of the cooling line, since the flow rate of the refrigerant of the cooling line is larger than that of the exhaust heat utilization line. This makes it possible to restrain a temperature change in the fuel cell caused by the refrigerant of the exhaust heat utilization line even if there is a large refrigerant temperature difference.

To attain the aforesaid object, another fuel cell system in accordance with the present invention is a fuel cell system which cools a fuel cell by circulating a refrigerant that flows into the fuel cell and which is capable of heating air-conditioning gas in an air-conditioning line by exhaust heat of the refrigerant that has passed through the fuel cell, comprising: a cooling line which has a first heat exchanger for cooling a refrigerant and circulates the refrigerant to the fuel cell; an exhaust heat utilization line which has a second heat exchanger for heat-exchanging the refrigerant with the air-conditioning gas in the air-conditioning line and which merges with the cooling line at a refrigerant inlet side of the fuel cell and branches from the cooling line at a refrigerant outlet side of the fuel cell; a bypass line through which a refrigerant flows, bypassing the fuel cell; and flow control means for controlling the flow of the refrigerant in the cooling line, the exhaust heat utilization line, and the bypass line. Further, the flow control means causes the refrigerant to flow in the bypass line to mix the refrigerants of the cooling line and the exhaust heat utilization line, then circulates the refrigerant to the fuel cell, cutting off the flow of the refrigerant in the bypass line.

With this configuration, even if there is a temperature difference in refrigerant between the cooling line (fuel cell) and the exhaust heat utilization line, the refrigerant first flows into the bypass line, thereby mixing the refrigerants of the cooling line and the exhaust heat utilization line. Thus, the temperature of the refrigerant is leveled even if the temperatures of the refrigerants are partly different in the cooling line and the exhaust heat utilization line. Hence, as described above, it is possible to restrain a temperature change in the fuel cell attributable to the refrigerant of the exhaust heat utilization line.

To attain the aforesaid object, a fuel cell system in accordance with the present invention includes a heat exchanger for cooling a refrigerant, a circulation passage through which a refrigerant is circulated between the heat exchanger and the fuel cell by a pump, a bypass passage through which the refrigerant in the circulation passage is supplied to the fuel cell, bypassing the heat exchanger, a fluidic valve for setting the flow of the refrigerant to the heat exchanger and the bypass passage, and control means for controlling the fluidic valve and the pump. Further, when starting up the fuel cell, the control means causes the driving of the pump to be started after the opening degree of the fluidic valve is changed from an initial opening degree to a predetermined opening degree.

With this configuration, when starting-up the fuel cell, the opening degree of the fluidic valve is set to the predetermined opening degree from the initial opening degree, and then the driving of the pump is begun. Hence, the refrigerant to be circulated can be supplied to the fuel cell when the fluidic valve reaches an opening degree suited to specifications, making it possible to restrain a temperature change in the fuel cell.

Here, "after changing to the predetermined opening degree" includes a case where the driving of the pump is begun later than the change and also a case where the driving of the pump is begun at the same time when the change is made.

Preferably, the fuel cell system further includes a temperature sensor for detecting the temperature of the refrigerant. The control means sets the fluidic valve to the predetermined opening degree on the basis of a detection result of the temperature sensor when starting-up the fuel cell.

This configuration allows the fluidic valve to be set to the predetermined opening degree according to the temperature of the refrigerant, thus making it possible to ideally restrain a temperature change in the fuel cell.

Preferably, a single or a plurality of temperature sensors is provided on the circulation passage and the bypass passage, and the control means sets the fluidic valve to the predetermined opening degree on the basis of detection results of a plurality of temperature sensors when starting-up the fuel cell.

With this configuration, the temperature of the refrigerant can be detected at a plurality of positions by the plurality of temperature sensors. This makes it possible to set the fluidic valve to the predetermined opening degree by taking a plurality of detection results into account, permitting improved controllability and reliability of the cooling apparatus.

Here, a plurality of temperature sensors may be provided, for example, at a refrigerant inlet side of the fuel cell and at a refrigerant outlet side thereof, and at an upstream side of the heat exchanger and at a downstream side thereof. The temperature sensor installed at the refrigerant outlet side of the fuel cell makes it possible to ideally reflect the temperature of the refrigerant in the fuel cell. Further, the temperature sensor installed at the downstream side of the heat exchanger makes it possible to ideally reflect the temperature of the refrigerant in the heat exchanger.

Preferably, the fuel cell system further includes a first temperature sensor for detecting the temperature of the refrigerant in the fuel cell and a second temperature sensor for detecting the temperature of the refrigerant in the heat exchanger. The control means sets the fluidic valve to a predetermined opening degree on the basis of a temperature difference between a detection result by the first temperature sensor and a detection result by the second temperature sensor when starting-up the fuel cell.

With this configuration, the fluidic valve can be set to a predetermined opening degree on the basis of a temperature difference between the refrigerant in the fuel cell and the refrigerant in the heat exchanger.

In this case, the first temperature sensor may detect a temperature that reflects the temperature of the refrigerant in the fuel cell. For this reason, the first temperature sensor may be provided in the circulation passage on the refrigerant outlet side of the fuel cell rather than in the fuel cell. Similarly, the second temperature sensor may detect a temperature that reflects the temperature of the refrigerant in the heat exchanger. For this reason, the second temperature sensor may be provided in the circulation passage at the downstream side of the heat exchanger rather than in the heat exchanger.

Preferably, the control means sets the fluidic valve to an opening degree, as the predetermined opening degree of the fluidic valve, such that the refrigerant is allowed to flow into the bypass passage while the fluidic valve blocks the flow of the refrigerant into the heat exchanger at the same time if a temperature difference is a threshold value or more.

With this configuration, a refrigerant of a relatively low temperature in the heat exchanger does not have to be merged with a refrigerant of a relatively high temperature in the fuel cell if the temperature difference is large, so that a temperature change in the fuel cell can be ideally restrained.

Here, "the opening degree that allows the refrigerant to flow into the bypass passage" includes not only an opening degree at which the fluidic valve is fully opened to the bypass passage but also includes an opening degree at which the fluidic valve is partly opened thereto.

Preferably, the predetermined opening degree is an opening degree at which the fluidic valve is fully opened to the bypass passage, and the control means starts the driving of the pump after a zero point adjustment for fully opening the fluidic valve when the fuel cell is started up.

With this configuration, the fluidic valve is fully opened to the bypass passage preferentially over the start of the driving of the pump, and at this time, the zero point adjustment of the fluidic valve is performed. This means that if the aforesaid temperature difference is a threshold value or higher, then the refrigerant is allowed to flow only into the bypass passage, which serves also as the zero point adjustment of the fluidic valve. The zero point adjustment permits highly accurate control of the opening degree of the fluidic valve when the fuel cell generates electric power.

According to a preferred embodiment, the predetermined opening degree is an opening degree at which the fluidic valve allows a refrigerant to flow into at least the bypass passage.

With this configuration, when starting-up the fuel cell, the refrigerant allowed to flow at least into the bypass passage can be supplied to the fuel cell. This permits successful suppression of a temperature change in the fuel cell.

Here, "to allow a refrigerant to flow into at least the bypass passage" means a case where the refrigerant is allowed to flow into only the bypass passage or into both the bypass passage and the heat exchanger. The ratio (flow ratio) in the latter case can be set, as necessary, on the basis of, for example, the aforesaid temperature of the refrigerant.

Preferably, the predetermined opening degree is an opening degree at which the fluidic valve fully opens to the heat exchanger.

This configuration securely obviates the need for supplying a refrigerant of the heat exchanger to the fuel cell when starting-up the fuel cell. Hence, a temperature change in the fuel cell can be securely restrained.

According to a preferred embodiment, the predetermined opening degree is an opening degree at which the fluidic valve is fully opened to the bypass passage, and the control means may start the driving of the pump after a zero point adjustment for fully opening the fluidic valve when the fuel cell is started up.

With this configuration, setting the fluidic valve so as to allow the refrigerant to circulate only to the bypass passage preferentially over the start of the driving of the pump can also serve as the zero point adjustment of the fluidic valve. Moreover, the zero point adjustment permits highly accurate control of the opening degree of the fluidic valve when the fuel cell generates electric power.

According to a preferred embodiment, when starting-up the fuel cell, the control means may change the fluidic valve to a predetermined opening degree (i.e., an opening degree at which the fluidic valve allows the refrigerant to circulate into at least the bypass passage) after the zero point adjustment of the fluidic valve of an initial opening degree.

With this configuration, the refrigerant that has passed through at least the bypass passage can be supplied to the fuel cell when starting-up the fuel cell. This permits successful suppression of a temperature change in the fuel cell. In addition, the zero point adjustment of the fluidic valve is performed prior thereto, so that the opening degree of the fluidic valve can be controlled with high accuracy when the fuel cell generates electric power.

Preferably, the control means sets the fluidic valve to be fully opened to the bypass passage, as the zero point adjustment of the fluidic valve.

With this configuration, after the zero point adjustment, the fluidic valve can be promptly set to the aforesaid predetermined opening degree to the bypass passage.

According to a preferred embodiment, the control means sets the fluidic valve to be fully opened to the heat exchanger, as the zero point adjustment of the fluidic valve.

With this configuration, even if, for example, the fluidic valve fails after the zero point adjustment, making it impossible to set the opening degree, the refrigerant that has been cooled by the heat exchanger will be supplied to the fuel cell when the fuel cell generates electric power. This prevents the fuel cell from overheating. In other words, fail-safe can be accomplished.

Preferably, an initial opening degree is an opening degree at which the fluidic valve allows a refrigerant to circulate into the heat exchanger.

With this configuration, the natural heat dissipation of the refrigerant in the fuel cell can be promoted when the fuel cell is stopped. Moreover, the zero point adjustment to, for example, the heat exchanger side can be promptly accomplished. In case of a failure, such as the fluidic valve being stuck, overheating of the fuel cell can be prevented.

According to a preferred embodiment, the initial opening degree may be an opening degree at which the fluidic valve allows the refrigerant to flow into the bypass passage.

This configuration permits prompt zero point adjustment to, for example, the bypass passage.

According to a preferred embodiment, the initial opening degree may be an opening degree at which the fluidic valve allows a refrigerant to circulate into both the heat exchanger and the bypass passage.

This configuration makes it possible to restrain overcooling and overheating of the fuel cell which is generating electric power if the fluidic valve fails, thus allowing fail-safe to be ideally achieved. Moreover, the zero point adjustment can be promptly performed to, for example, both the heat exchanger and the bypass passage.

Preferably, the control means sets the fluidic valve to the initial opening degree when stopping the fuel cell.

With this configuration, the fluidic valve can be appropriately set to a desired initial opening degree when the fuel cell is started up. Preferably, when the fuel cell stops, the driving of the pump is stopped and then the fluidic valve is set to the initial opening degree.

To attain the aforesaid object, another fuel cell system in accordance with the present invention includes a heat exchanger for cooling a refrigerant, a circulation passage through which a refrigerant is circulated between the heat exchanger and a fuel cell by a pump, a bypass passage through which the refrigerant in the circulation passage is supplied to the fuel cell to bypass the heat exchanger, a fluidic valve for setting the circulation of the refrigerant to the heat exchanger and the bypass passage, and control means for controlling the fluidic valve and the pump. When stopping the fuel cell, the control means causes the driving of the pump to be stopped and then sets the fluidic valve to a predetermined initial opening degree. In this case, the initial opening degree is preferably an opening degree at which the fluidic valve allows the refrigerant to flow into the heat exchanger.

According to these configurations, when the fuel cell is stopped, the driving of the pump is stopped and the circulation of the refrigerant is stopped, and then the fluidic valve is set to a predetermined initial opening degree thereafter. Even if the opening degree of the fluidic valve cannot be set due to a failure when stopping the fuel cell, the refrigerant that has been cooled by the heat exchanger is supplied to the fuel cell when the fuel cell generates electric power, thus making it possible to prevent the fuel cell from overheating. In other words, a temperature change in the fuel cell can be restrained and fail-safe can be achieved.

Preferably, when starting-up the fuel cell, the control means starts the driving of the pump after changing the fluidic valve from an initial opening degree to a predetermined opening degree.

With this configuration, when starting-up the fuel cell, the opening degree of the fluidic valve is set to a predetermined opening degree from an initial opening degree and then the driving of the pump is begun thereafter. This allows the refrigerant to be supplied to the fuel cell when the fluidic valve has reached an opening degree suited to specifications. Thus, when starting-up the fuel cell, a temperature change therein can be suppressed.

To attain the aforesaid object, another fuel cell system in accordance with the present invention includes a heat exchanger for cooling a refrigerant, a circulation passage through which a refrigerant is circulated between the heat exchanger and a fuel cell by a pump, a bypass passage through which the refrigerant in the circulation passage is supplied to the fuel cell to bypass the heat exchanger, a fluidic valve for setting the flow of the refrigerant to the heat exchanger and the bypass passage, and control means for controlling the fluidic valve and the pump. When starting up the fuel cell, the control means carries out zero point adjustment on the fluidic valve and also changes the opening degree after the zero point adjustment to a predetermined opening degree preferentially over starting the driving of the pump.

With this configuration, when starting-up the fuel cell, the fluidic valve is zero-point-adjusted and the opening degree thereof is set to the predetermined opening degree, and then the driving of the pump is begun thereafter. Thus, when the fuel cell starts up, the refrigerant can be supplied to the fuel cell when the fluidic valve has been set to an opening degree that conforms to specifications, making it possible to suppress a temperature change in the fuel cell. In addition, the zero point adjustment permits highly accurate control of the opening degree of the fluidic valve when the fuel cell generates electric power.

Preferably, the fluidic valve is a rotary valve.

This configuration makes it possible to properly and accurately deal with a fuel cell, which is sensitive to temperature control.

BRIEF DESCRIPTION OF DRAWINGS

FIGS. 13 (A) to (C) are cross-sectional diagrams schematically explaining opening degrees of the rotary valve shown in FIG. 12.

BEST MODE FOR CARRYING OUT THE INVENTION

The following will describe fuel cell systems according to preferred embodiments of the present invention, with reference to the accompanying drawings. The fuel cell systems have refrigerant circulation systems for circulatively supplying refrigerants to fuel cells. The refrigerant circulation systems are adapted to restrain refrigerants that have a predetermined difference in temperature from the fuel cells from flowing into the fuel cells. The following will explain fuel cell systems having constructions considering the utilization of exhaust heat and fuel cell systems having constructions based on a different viewpoint from the utilization of exhaust heat.

To be more specific, in a first embodiment to a seventh embodiment (FIG. 1 to FIG. 8), the fuel cell systems utilizing the exhaust heat of refrigerants that have cooled fuel cells will be explained. To briefly explain, the fuel cell systems are adapted to be mounted in fuel-cell vehicles, such as automobiles. Further, the fuel cell systems are adapted to cool fuel cells by refrigerants in main cooling lines and also to utilize the exhaust heat of the refrigerants, which have cooled the fuel cells, for heating, for example, the interiors of vehicles. The fuel cell systems in accordance with the present invention are characterized in that the flows of refrigerants in cooling lines and in exhaust heat utilization lines are controlled so as not to cause thermal shocks to the fuel cells attributable to low-temperature refrigerants in the exhaust heat utilization lines.

In an eighth embodiment to a sixteenth embodiment (FIG. 9 to FIG. 19), other fuel cell systems giving considerations to a different aspect from the utilization of exhaust heat will be explained. Briefly speaking, the fuel cell systems have cooling apparatuses of fuel cells, and the cooling apparatuses lower the temperatures of the fuel cells caused by generation of electric power and control the temperatures of the fuel cells during the generation of electric power. The fuel cell systems in accordance with the present invention are characterized primarily by predetermined control carried out on fluidic valves and pumps in the cooling apparatuses of the fuel cells, thereby ideally restraining temperature changes in the fuel cells when the fuel cells are started up (warmed up).

First Embodiment

Figure 1:
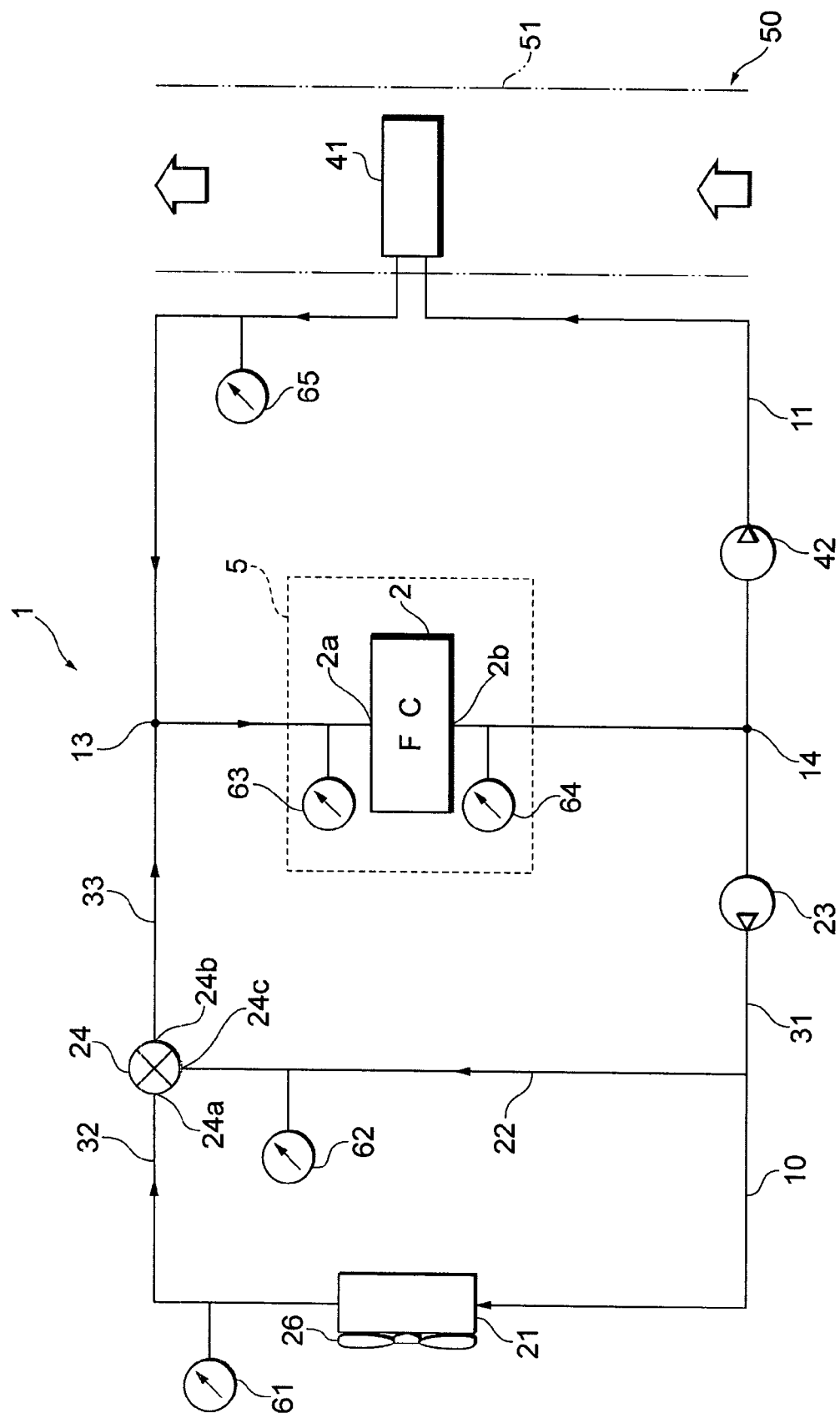
FIG. 1 is a configuration diagram showing the configuration of a fuel cell system according to a first embodiment.

FIG. 1 is a system diagram showing a cooling system of a fuel cell system.

A fuel cell system 1 has a fuel cell 2 of a stack structure having a laminate of multiple unit cells, which are basic units, and a controller 3 (refer to FIG. 2) which overall controls the entire system. A stack case 5 houses the fuel cell 2 together with peripheral detecting devices and the like. The stack case 5 is formed of a metal or hard resin material and fixed to the bottom of the floor or the like of a vehicle interior through the intermediary of a bracket or the like. Hydrogen gas as fuel gas and air as oxidant gas are supplied to the fuel cell 2 through piping lines, which are not shown. The fuel cell 2 generates electric power by an electrochemical reaction of these two gases and also generates heat.

The fuel cell 2 comes in a plurality of types, including a phosphoric-acid type; the fuel cell in the present embodiment is composed of a solid polymer electrolytic type, which is ideally suited for installation in a vehicle. Although not shown, a unit cell of the fuel cell 2 is formed by an MEA (Membrane Electrode Assembly) sandwiched between a pair of separators made of a metal or the like. As inner flow passages in the stack-structured fuel cell 2, a flow passage of fuel gas, a flow passage of oxidant gas, and a flow passage of cooling water are provided. These flow passages are formed primarily in the planes of the separators. The fuel cell 2 is cooled by the cooling water serving as a refrigerant passed through the inner flow passages for the cooling water.

The fuel cell system 1 has a cooling line 10 shown on the left in the figure and an exhaust heat utilization line 11 on the right in the figure, as the lines for circulating the cooling water (a refrigerant circulation system) to the fuel cell 2. The cooling line 10 and the exhaust heat utilization line 11 are provided with a confluence 13 for merging the cooling water at a cooling water inlet 2a of the fuel cell 2 and a branch point 14 for splitting the cooling water at a cooling water outlet 2b of the fuel cell 2. The confluence 13 and the branch point 14 may be provided with valves, such as three-way valves, so as to make it possible to block the merging of the cooling water at the confluence 13 or to branch the cooling water only in one way at the branch point 14.

The cooling line 10 has a radiator 21 for cooling the cooling water discharged from the fuel cell 2, a bypass passage 22 for bypassing the radiator 21, a cooling pump 23 for pressure-feeding the cooling water in the cooling line 10, and a switching valve 24 for setting the flow of the cooling water to the radiator 21 and the bypass passage 22. The cooling line 10 is formed primarily of a first passage 31 from the cooling water outlet 2b of the fuel cell 2 to an inlet of the radiator 21, a second passage 32 from an outlet of the radiator 21 to a first port 24a of the switching valve 24, and a third passage 33 from a second port 24b of the switching valve 24 to the cooling water inlet 2a of the fuel cell 2.

The radiator 21 (a first heat exchanger) has therein a passage that leads the cooling water whose temperature has risen due to an electric generation reaction of the fuel cell 2, and the cooling water is heat-exchanged (heat-dissipated) with outside air by passing through the passage in the radiator 21. The radiator 21 is provided, for example, on the front of a vehicle. The radiator 21 is also provided with a fan 26 for blowing outside air to the internal passage. The fan 26 accelerates the cooling of the cooling water in the radiator 21. The fan 26 is connected to the controller 3 and the driving thereof is controlled by the controller 3.

The bypass passage 22 has a upstream end connected to the downstream end of the cooling pump 23 of the first passage 31, and a downstream end connected to a third port 24c of the switching valve 24. The bypass passage 22 has no auxiliary device having a cooling effect.

The cooling pump 23 is connected to the controller 3 and the driving thereof is controlled by the controller 3. When the driving of the cooling pump 23 is begun, the cooling water in the cooling line 10 flows to maintain the temperature of the fuel cell 2 within a predetermined range. Then, when the driving of the cooling pump 23 is stopped, the flow of the cooling water in the cooling line 10 is stopped. Note, the cooling pump 23 positioned on the upstream side of the radiator 21 may be of course positioned on the downstream side of the radiator 21 or the switching valve 24.

The switching valve 24 has a three-way vale structure having the first port 24a, the second port 24b, and the third port 24c. The switching valve 24 is formed of, for example, a rotary valve, and configured so as to switch the cooling water to one of the radiator 21 and the bypass passage 22 or to both thereof.

For instance, if the switching valve 24 is changed over to the radiator 21, then the cooling line 10 functions as a circulation passage for circulating the cooling water between the radiator 21 and the fuel cell 2. Meanwhile, if the switching valve 24 is changed over to the bypass passage 22, the cooling line 10 functions as a circulation passage for circulatively supplying the cooling water to the fuel cell 2 to bypass the radiator 21. In this case, the cooling water that is not subjected to the heat dissipation effect by the radiator 21 flows into the fuel cell 2.

The switching valve 24 is configured to permit the adjustment of the opening degree of the valve so as to permit the adjustment of the inflow rate of the cooling water into the radiator 21 and the bypass passage 22. The switching valve 24 is connected to the controller 3, and the opening degree of the valve, including a switching operation, is controlled by output signals from the controller 3. This type of switching valve 24 may be composed of, for example, an electromagnetic valve type driven by a solenoid, a motor-operated valve type driven by a motor, or a type driven by electric/magnetic forces of a piezoelectric element, a magnetostrictive element or the like.

The exhaust heat utilization line 11 has a heater core 41 (a second heat exchanger) for heat-exchanging the cooling water discharged from the fuel cell 2 with an air-conditioning gas, and an exhaust heat utilization pump 42 for pressure-feeding the cooling water of the exhaust heat utilization line 11. The exhaust heat utilization line 11 is a line that utilizes the exhaust heat of the cooling water discharged from the fuel cell 2 to cool the cooling water by heating air-conditioning gas, and functions as a circulation passage for circulating the cooling water between the heater core 41 and the fuel cell 2.

The exhaust heat utilization pump 42 is connected to the controller 3, and the driving thereof is controlled by the controller 3. As will be described later, the exhaust heat utilization pump 42 is controlled in cooperation with the cooling pump 23. When the driving of the exhaust heat utilization pump 42 is begun, the cooling water in the exhaust heat utilization line 11 flows and the cooling water that has been heat-exchanged in the heater core 41 flows into the fuel cell 2. Then, when the driving of the exhaust heat utilization pump 42 is stopped, the flow of the cooling water in the exhaust heat utilization line 11 is stopped. Note, the exhaust heat utilization pump 42, which has been positioned on the upstream side of the heater core 41, may be of course positioned on the downstream side of the heater core 41.

The heater core 41 is mounted, for example, on the front of a vehicle, as with the radiator 21. The heater core 41 has therein a passage that leads the cooling water whose temperature has risen due to an electric generation reaction of the fuel cell 2, and the cooling water is heat-exchanged (heat-dissipated) with air-conditioning gas by passing through the passage in the heater core 41. Hence, the heater core 41 is disposed in an air-conditioning line 51 (duct) in an air conditioner 50 that provides a passage for the air-conditioning gas.

The air conditioner 50 takes in, for example, the air in a vehicle (internal air) or the air outside the vehicle (outside air), conditions the air and blows the conditioned air into the vehicle. The air conditioner 50 has, although not shown, an evaporator provided on the upstream side of the heater core 41 in the air-conditioning line 51 and a blower, which is provided on the upstream side of the evaporator and pressure-feeds air-conditioning gas to the heater core 41. For example, a blowout port, through which air-conditioning gas is supplied into a vehicle, is provided at the bottommost downstream of the air-conditioning line 51.

Figure 2:
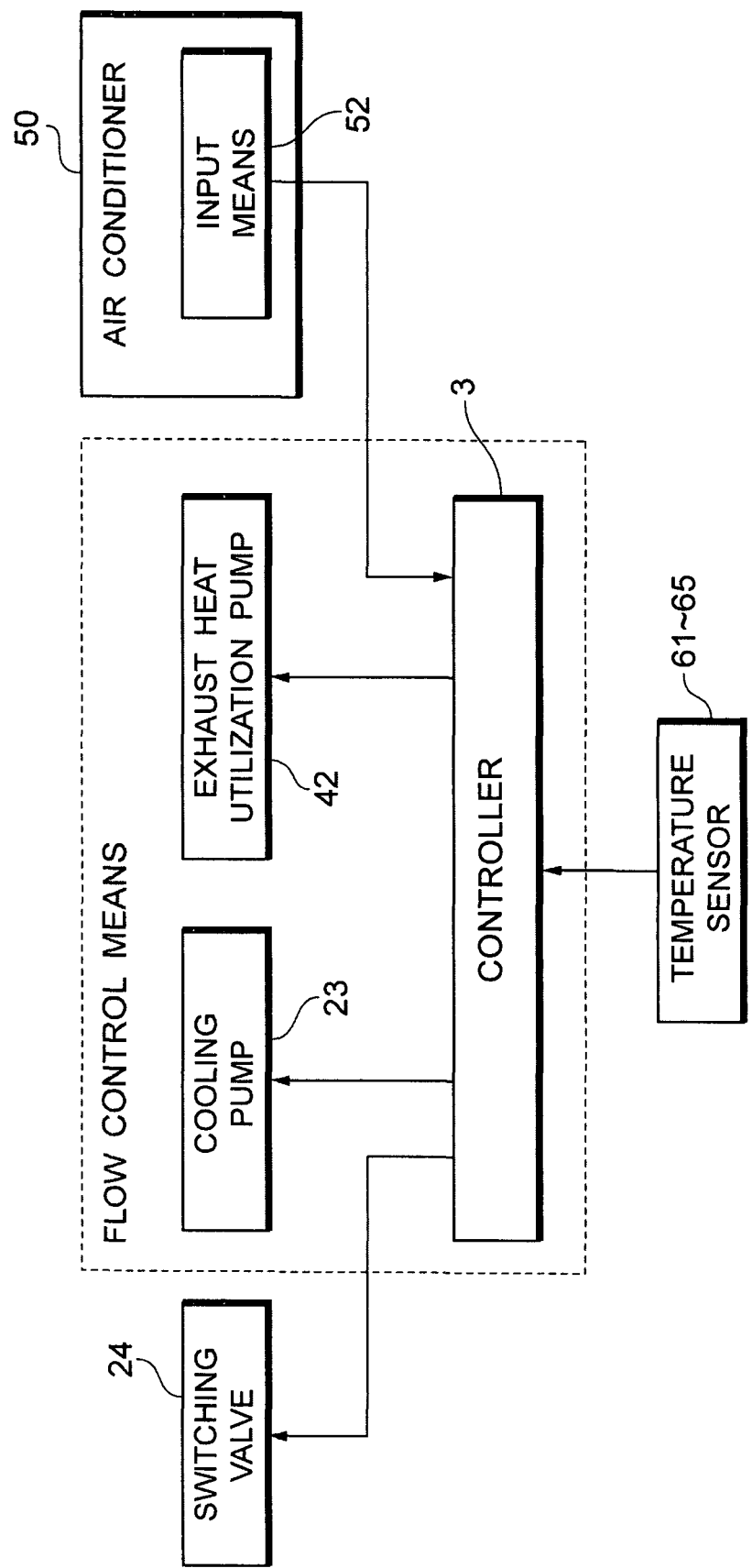
FIG. 2 is a block diagram of the fuel cell system according to the first embodiment.

The air conditioner 50 has an input means 52, such as a switch, which enables a user to perform an input operation (refer to FIG. 2). The input means 52 enables the user to give instructions on the execution of blowing air conditioning gas of the air conditioning line 51. More specifically, when the input means 52 receives an input, the air conditioner 50 performs warming up. At this time, the cooling water flows into both the cooling line 10 and the exhaust heat utilization line 11, and the air conditioning gas that has been heated by the heater core 41 is supplied into the vehicle. Meanwhile, if no input is supplied to the input means 52, then the air conditioner 50 is not actuated and the supply of the air conditioning gas into the vehicle is shut off, the cooling water flowing only in the cooling line 10. Note, an configuration may be made such that the air conditioner 50 can be switched to a cooling operation by the input means 52.

The cooling line 10 and the exhaust heat utilization line 11 are provided with a plurality of temperature sensors 61-65 along the lines in a scattered manner. To be more specific, there are provided a temperature sensor 61 on the downstream side of the radiator 21, a temperature sensor 62 on the bypass passage 22, a temperature sensor 63 at the cooling water inlet 2a of the fuel cell 2, a temperature sensor 64 at the cooling water outlet 2b thereof, and a temperature sensor 65 at the downstream side of the heater core 41. The temperature sensors 63 and 64 near the cooling water inlet 2a and the cooling water outlet 2b of the fuel cell 2 are housed in the stack case 5. However, these temperature sensors 63 and 64 may be provided outside the stack case 5.

The temperature sensor 61 at the downstream side of the radiator 21 detects a temperature that reflects the temperature of the cooling water at the outlet of the radiator 21. Further, the temperature sensor 64 at the cooling water outlet 2b detects a temperature that reflects the temperature of the cooling water in the fuel cell 2. The temperature sensor 65 at the downstream side of the heater core 41 detects a temperature that reflects the temperature of the cooling water that has passed through the heater core 41. These plural temperature sensors 61 to 65 are connected to the controller 3, and supply their detection results to the controller 3.

FIG. 2 is a block diagram showing a control configuration of the fuel cell system 1. The controller 3 (ECU) has a CPU, a ROM storing control programs and control data to be processed by the CPU, a RAM used as various work areas mainly for control processing, and an input/output interface, none of which are shown. These are connected with each other through the intermediary of buses.

Connected to the input/output interface are various types of sensors, including a plurality of temperature sensors 61 to 65, and the input means 52 in the air conditioner 50 in addition to various types of drivers for driving the cooling pump 23, the switching valve 24, the exhaust heat utilization pump 42, and the like. The controller 3 functions as a flow control means that works in cooperation with the cooling pump 23 and the exhaust heat utilization pump 42 to control the flow of the cooling water in the cooling line 10 and the exhaust heat utilization line 11. The flow control means restrains the cooling water that has a predetermined temperature difference from the fuel cell 2 from flowing into the fuel cell 2, as will be discussed hereinafter.

According to a control program in the ROM, the CPU receives detection signals of the temperature sensors 61 to 65 and the like and input signals of the input means 52 through the intermediary of the input/output interface, processes various types of data and the like in the RAM and then outputs control signals to the various drivers through the intermediary of the input/output interface, thereby integrally controlling the entire fuel cell system 1, including the cooperative control of the cooling pump 23 and the exhaust heat utilization pump 42.

As described above, if there is no demand of heating the interior of the vehicle while the fuel cell system 1 is in operation, then the cooling water flows only in the cooling line 10. Thus, the cooling water retained in the exhaust heat utilization line 11 has a lower temperature, as compared with the cooling water in the cooling line 10 or the fuel cell 2. Here, if a demand for heating is encountered when the operation of the fuel cell system 1 is stopped once and then restarted in a short time and if the cooling water in the exhaust heat utilization line 11 is allowed to flow into the fuel cell 2 prior to the cooling water in the cooling line 10, then a temperature difference in the cooling water undesirably causes a thermal shock to the fuel cell 2. According to the present embodiment, therefore, control is carried out such that the flow of the cooling water in the exhaust heat utilization line 11 is begun after the flow of the cooling water in the cooling line 10 is begun.

1. At Start-Up

Specifically, if an input of the demand for heating is supplied to the input means 52 when starting-up (warming-up) the fuel cell 2, the controller 3 starts the driving of the cooling pump 23 and then starts the driving of the exhaust heat utilization pump 42. This causes the flow of the cooling water in the exhaust heat utilization line 11 to be delayed from the flow of the cooling water of the cooling line 10, thus allowing the cooling water of the cooling line 10 to flow into the fuel cell 2 first. Hence, even if there is a considerable temperature difference in cooling water between the cooling line 10 and the exhaust heat utilization line 11, a temperature change in the fuel cell 2 will be suppressed.

At this time, if the controller 3 starts the driving of the exhaust heat utilization pump 42 after the flow rate of the cooling water by the cooling pump 23 has sufficiently increased, then a temperature change in the fuel cell 2 can be further suppressed. More specifically, the controller 3 preferably carries out flow rate control such that the flow rate of the cooling water by the cooling pump 23 is larger than the flow rate of the cooling water by the exhaust heat utilization pump 42 in an initial period of the driving, during which both pumps 23 and 42 are cooperatively controlled. Further, the driving of the exhaust heat utilization pump 42 is preferably controlled such that the flow rate of the cooling water of the exhaust heat utilization line 11 gradually increases.

The timing at which the driving of the exhaust heat utilization pump 42 is begun may be a timing at which, for example, a predetermined time stored in the ROM beforehand has elapsed since the driving of the cooling pump 23 was begun or a timing based on a detection result of a flow rate sensor, not shown, provided at, for example, the cooling water inlet 2a of the fuel cell 2 in the cooling line 10. Further, in another mode, the driving of the exhaust heat utilization pump 42 may be begun when the number of revolutions of the cooling pump 23 reaches a predetermined number or more, for example, when the cooling pump 23 has completely started up. Incidentally, the number of revolutions of the cooling pump 23 may be detected by an RPM sensor connected to the cooling pump 23.

The time from the stop of the fuel cell 2 to the next start-up of the fuel cell 2 may be measured by a timer, which is incorporated in the controller 3, in cooperation with or independently from a flow sensor, and based on the length of the measured time, the start time at which the driving of the exhaust heat utilization pump 42 is started may be varied. Thus, if the stop time of the fuel cell 2 is relatively long, the start of the driving of the exhaust heat utilization pump 42 does not have to be delayed relative to the start of the driving of the cooling pump 23. Further, if the stop time of the fuel cell 2 is relatively short, the start of the driving of the exhaust heat utilization pump 42 can be sufficiently delayed until the flow rate of the cooling water in the cooling line 10 sufficiently increases.

Further preferably, the start time at which the driving of the exhaust heat utilization pump 42 is started is varied based on the temperature sensors 61 to 65 in cooperation with or independently from the flow sensor or the timer. For instance, the heat radiation condition of the cooling water at each portion varies depending on the environment in which the fuel-cell vehicle is placed, so that the temperature change in the fuel cell 2 can be further restrained by using the plurality of temperature sensors 61 to 65, which detect the temperature of the cooling water, rather than by setting the start time of the driving of the exhaust heat utilization pump 42 only by the timer.

For example, the start time of the driving of the exhaust heat utilization pump 42 is set based on the temperature difference between the cooling water in the fuel cell 2 and the cooling water in the exhaust heat utilization line 11 from detection results of the temperature sensor 64 at the cooling water outlet 2b of the fuel cell 2 and the temperature sensor 65 of the exhaust heat utilization line 11, in particular, among the plurality of temperature sensors 61 to 65. Alternatively, the start time of the driving of the exhaust heat utilization pump 42 is set based on the temperature difference in the cooling water between the cooling line 10 and the exhaust heat utilization line 11 from the detection results of the temperature sensor 61 and the temperature sensor 65. At this time, if there is no temperature difference, then the driving of the cooling pump 23 and the exhaust heat utilization pump 42 may be simultaneously started. Thus, the driving conditions of the cooling pump 23 and the exhaust heat utilization pump 42 may be changed according to the temperature of the cooling water.

Further, in place of the control configuration described above, the controller 3 may simultaneously starts the driving of the cooling pump 23 and the exhaust heat utilization pump 42 when an input of the demand for heating is supplied to the input means 52 when starting-up the fuel cell 2. It is necessary, however, to carry out flow control such that the flow rate of the cooling water by the cooling pump 23 is higher than the flow rate of the cooling water by the exhaust heat utilization pump 42 in order to avoid a temperature change in the cooling water flowing into the fuel cell 2. Conducting such flow control makes it possible to bring the temperature of the merged cooling water from the cooling line 10 and the exhaust heat utilization line 11 close to the temperature of the cooling water of the cooling line 10. This type of flow rate control can be accomplished by RPM control over the cooling pump 23 and the exhaust heat utilization pump 42 or the duty ratio control.

Further, in place of the control configuration described above, even if no input of the demand for heating is supplied to the input means 52 when starting-up the fuel cell 2, the controller 3 may start, at every start-up of the fuel cell 2, the driving of the exhaust heat utilization pump 42 after starting the driving of the cooling pump 23, and perform the driving of the exhaust heat utilization pump 42 for a predetermined time. It is needless to say that, at this time, the flow rate control may be carried out such that the flow rate by the cooling pump 23 becomes larger, while simultaneously starting the driving of the cooling pump 23 and the exhaust heat utilization pump 42.

This control configuration is more advantageous than the configuration in which the cooling water in the exhaust heat utilization line 11 does not flow without exception when no input is supplied to the input means 52. To be specific, if heating is not used for an extended period of time during the summer or the like, the cooling water in the exhaust heat utilization line 11 may remain therein, possibly causing a problem, such as foreign matters building up or algae growing in the exhaust heat utilization line 11. According to the aforesaid control configuration, the exhaust heat utilization pump 42 is briefly driven when starting-up the fuel cell 2 whether there is a demand for heating or not (regardless of an input to the input means 52), so that the cooling water in the exhaust heat utilization line 11 flows, thus making it possible to properly obviate the aforesaid problems.

As described above, conducting various types of flow rate control makes it possible to avoid a thermal shock to the fuel cell 2 due to the cooling water of the exhaust heat utilization line 11 when starting-up the fuel cell 2. If both the cooling pump 23 and the exhaust heat utilization pump 42 are being driven when stopping the fuel cell 2, then the driving of the exhaust heat utilization pump 42 is stopped first, and then the driving of the cooling pump 23 is stopped thereafter. This makes it possible to stop the flow of the cooling water of the exhaust heat utilization line 11 preferentially over the flow of the cooling water in the cooling line 10, allowing a temperature change in the fuel cell 2 to be ideally restrained.

2. During Intermittent Operation

A brief explanation will now be given to the flow control of the cooling water during an intermittent operation of the fuel cell 2. The intermittent operation of the fuel cell 2 means that the supply of electric power from the fuel cell 2 to a load is temporarily stopped, and electric power is supplied from a secondary cell to the load. The intermittent operation is accomplished by intermittently supplying fuel gas and oxidant gas to the fuel cell 2 and by maintaining the open end voltage of the fuel cell 2 within a predetermined range. In the intermittent operation, there is a case where the driving of a pump is stopped to stop the flow of the cooling water to be circulated to the fuel cell 2.

In the fuel cell system 1 according to the present embodiment, the controller 3 continues the driving of the cooling pump 23 by the electric power supplied from the secondary cell to continue the flow of cooling water to the fuel cell 2 during the intermittent operation of the fuel cell 2. With this configuration, the temperature of the fuel cell 2 can be properly controlled also during the intermittent operation.

It is also possible to circulate the cooling water of the exhaust heat utilization line 11 into the fuel cell 2 by driving the exhaust heat utilization pump 42 rather than the cooling pump 23. Preferably, however, when the exhaust heat utilization pump 42 is driven in the intermittent operation, the driving of the exhaust heat utilization pump 42 is begun after the driving of the cooling pump 23 is begun. It is needless to say that, at this time, the flow rate control may be conducted such that the flow rate by the cooling pump 23 becomes larger, while starting the driving of the cooling pump 23 and the exhaust heat utilization pump 42 simultaneously. This is to obviate a thermal shock being applied to the fuel cell 2 attributable to the cooling water in the exhaust heat utilization line 11, as described above, also during the intermittent operation.

The following will explain a second embodiment through a seventh embodiment. The control example explained in the first embodiment can be applied to all these embodiments. To avoid repeated description, the following explanation will give the same reference characteristics to the same parts as those in the first embodiment and will focus on different aspects from the first embodiment in order to avoid repeated description.

Second Embodiment

Figure 3:
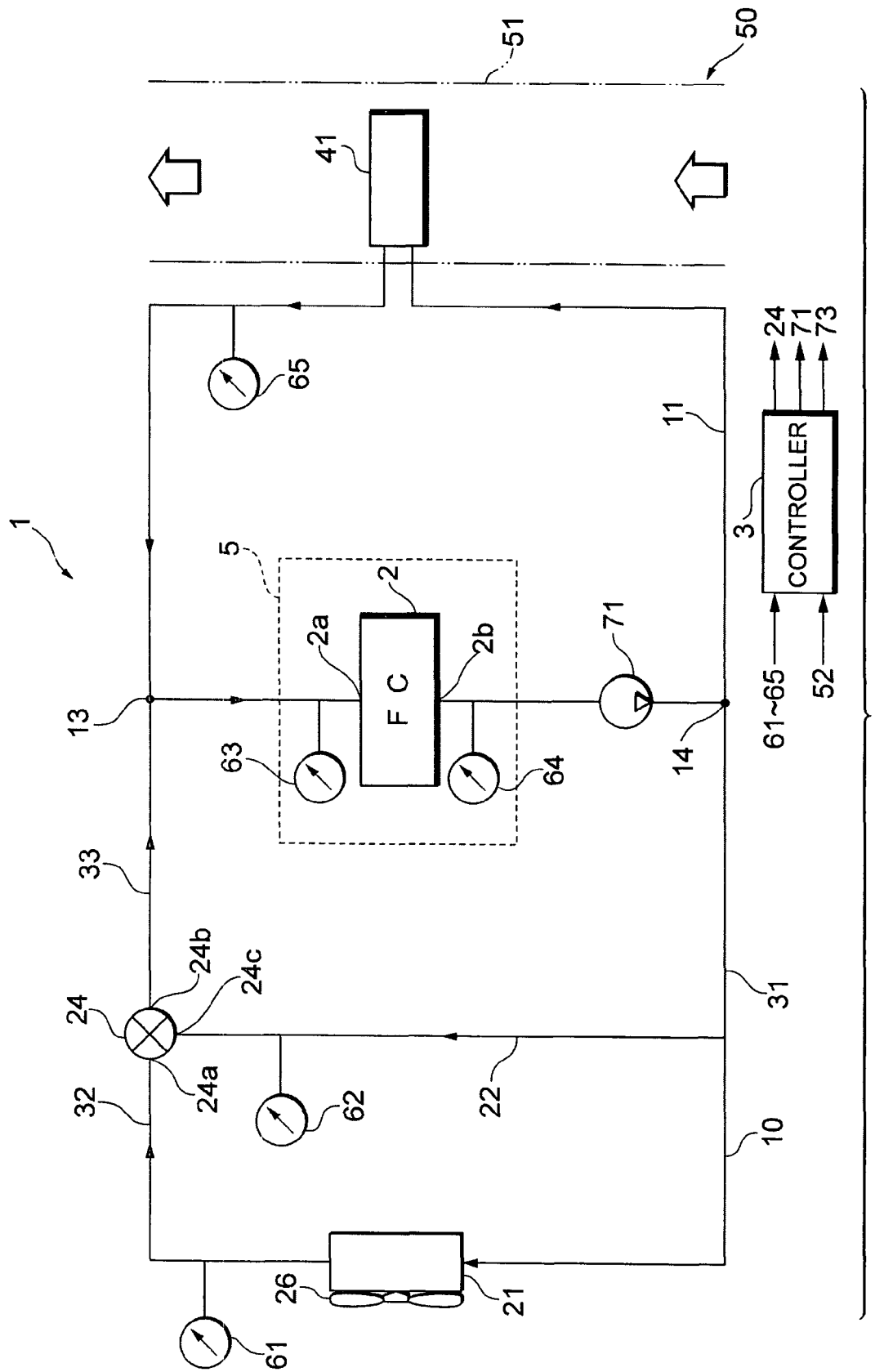
FIG. 3 is a configuration diagram showing the configuration of a fuel cell system according to a second embodiment.

Referring to FIG. 3, a fuel cell system 1 according to a second embodiment will be explained. The second embodiment is different from the first embodiment in that there is only one pump 71 for circulating cooling water and accordingly pressure drop tuning is carried out on a cooling line 10 and an exhaust heat utilization line 11.

The pump 71 in the present embodiment is provided on the upstream side of a branch point 14 of the cooling line 10 and the exhaust heat utilization line 11. The pump 71, however, may be provided on the downstream side of the confluence 13. The driving of the pump 71 is controlled by a controller 3, and pressure-feeds cooling water in the cooling line 10 and the exhaust heat utilization line 11. In cooperation with the controller 3, the pump 71 functions as a flow control means for controlling the flow of the cooling water in the cooling line 10 and the exhaust heat utilization line 11. As with the first embodiment, the flow control means restrains the inflow of cooling water that has a temperature difference from a fuel cell 2 into the fuel cell 2.

The flow passage resistance of the cooling water in the cooling line 10 is set to be lower than the flow passage resistance of the cooling water in the exhaust heat utilization line 11. As the pressure drop tuning for setting the flow passage resistance, the diameter of the exhaust heat utilization line 11 is set to about 1/10 of the diameter of the cooling line 10. Alternatively, however, a throttling part, such as an orifice, for making it difficult for the cooling water to flow through may be provided at some midpoint of the exhaust heat utilization line 11.

According to the present embodiment, even if the pump 71 is driven at a start-up or during an intermittent operation of the fuel cell 2, the pressure drop tuning described above causes the cooling water in the cooling line 10 to start flowing into the fuel cell 2 preferentially over the cooling water in the exhaust heat utilization line 11. With this configuration, a temperature change at a start-up or the like of the fuel cell 2 can be restrained even if the number of the pumps has been reduced by one. Moreover, since the flow of the cooling water is controlled by the single pump 71, the control can be simplified.

The exhaust heat utilization line 11 may be provided with a shut valve, and the shut valve may be opened when there is a demand for heating, while the shut valve may be closed if there is no demand for heating. Further, the shut valve may be opened/closed according to a measurement result of the timer or detection results of the flow sensor or the temperature sensors 61 to 65 described above. For example, if an input of the demand for heating is supplied to an input means 52 when the fuel cell 2 is started up, then the timing for opening the shut valve that has been closed can be set on the basis of detection results of the timer or various sensors.

Further, as a modification of the second embodiment, the confluence 13 or a branch point 14 of the cooling line 10 and the exhaust heat utilization line 11 may be provided with a switching valve 73 for switching the flow of the cooling water between the cooling line 10 and the exhaust heat utilization line 11 (FIG. 3 shows only signal lines from the controller 3). The switching valve 73, which can be configured in the same manner as the switching valve 24 adjacent to the radiator 21 described above, is connected to the controller 3. The switching valve 73, together with the pump 71 and the controller 3, constitutes a flow control means that controls the flow of the cooling water in the cooling line 10 and the exhaust heat utilization line 11.

Further, when beginning the flow of the cooling water in the exhaust heat utilization line 11 into the fuel cell 2, the controller 3 changes the switching valve 73 over to the cooling line 10 to first start the flow of the cooling water of the cooling line 10 into the fuel cell 2. Thereafter, the switching valve 73 is changed over to both the cooling line 10 and the exhaust heat utilization line 11 so as to allow the cooling water of the cooling line 10 and the exhaust heat utilization line 11 to flow into the fuel cell 2. Controlling the switching valve 73 as described above also makes it possible to start the flow of the cooling water of the cooling line 10 preferentially over the exhaust heat utilization line 11 into the fuel cell 2, so that a temperature change in the fuel cell 2 can be restrained. Moreover, the need for complicated pressure drop tuning of the cooling line 10 and the exhaust heat utilization line 11 is obviated.

Third Embodiment

Figure 4:
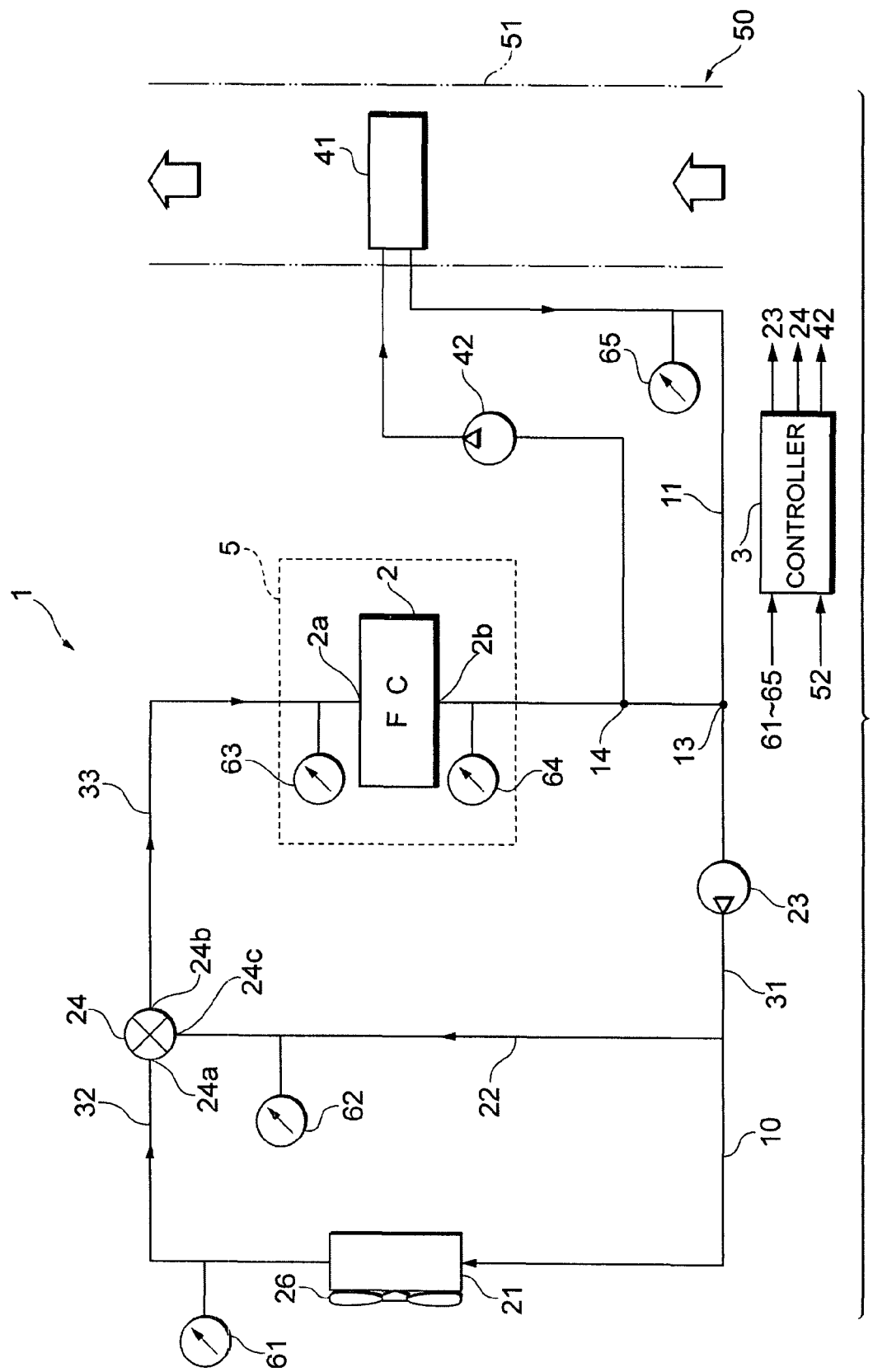
FIG. 4 is a configuration diagram showing the configuration of a fuel cell system according to a third embodiment.

Referring to FIG. 4, a fuel cell system 1 according to a third embodiment will be explained. The third embodiment is different from the first embodiment in the positions of a confluence 13 and a branch point 14. To be specific, the confluence 13 and the branch point 14 are provided adjacently to a cooling water outlet 2b of a fuel cell 2, and the confluence 13 is provided at the downstream side of the branch point 14 and at the upstream side of a cooling pump 23. This piping system makes it possible to provide the same advantages as those of the first embodiment by carrying out cooperative control over the cooling pump 23 and an exhaust heat utilization pump 42 in the same manner as the first embodiment.

Especially in the present embodiment, when starting-up the fuel cell 2, it is preferred to first change a switching valve 24 over to a bypass passage 22 to start the driving of the cooling pump 23 and then change the switching valve 24 over to a radiator 21, while starting the driving of the exhaust heat utilization pump 42. The cooling pump 23 may alternatively be positioned on the downstream side of the radiator 21, and the exhaust heat utilization pump 42 may alternatively be positioned on the downstream side of a heater core 41.

Fourth Embodiment

Figure 5:
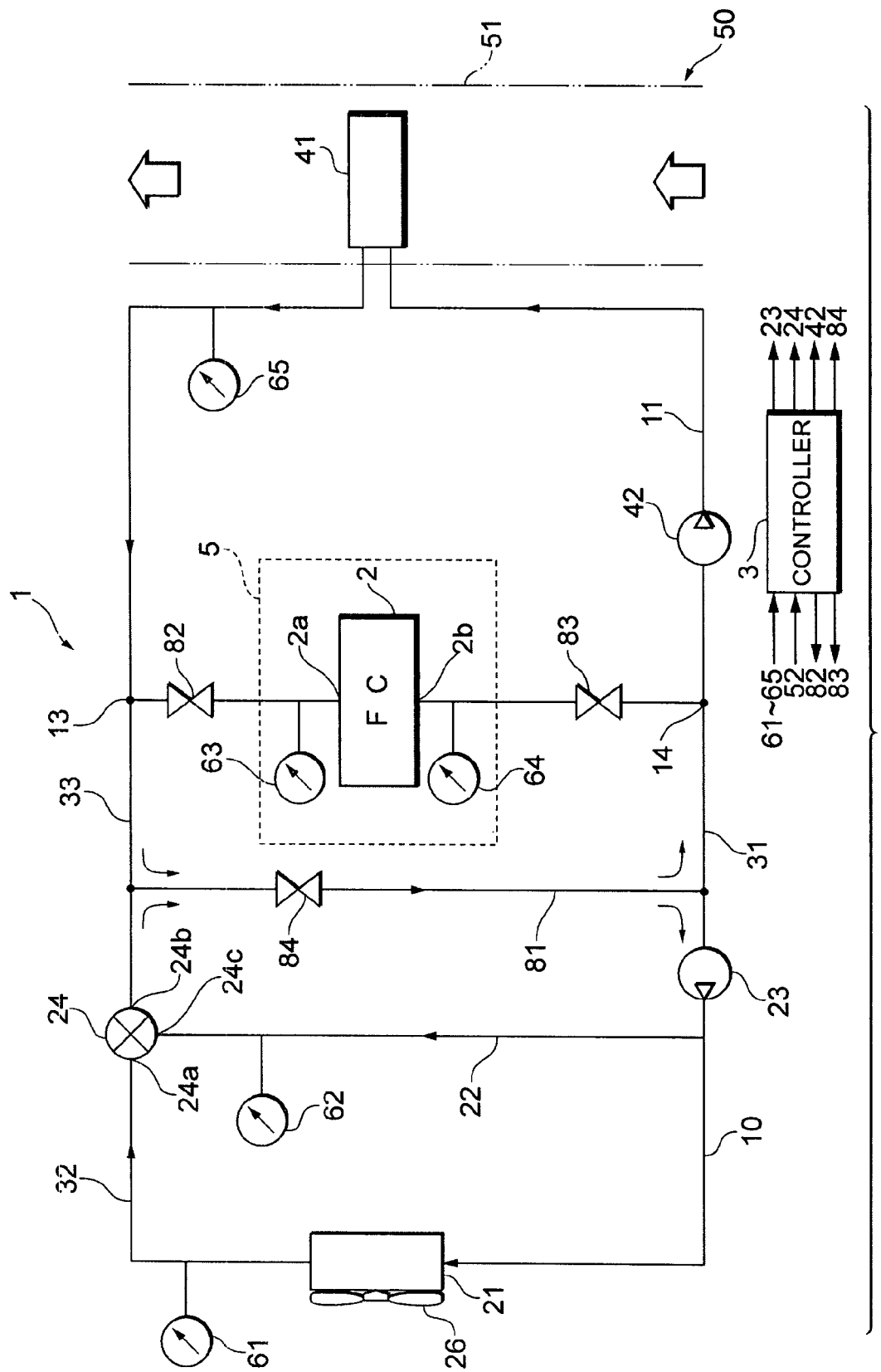
FIG. 5 is a configuration diagram showing the configuration of a fuel cell system according to a fourth embodiment.

Referring to FIG. 5, a fuel cell system 1 according to a fourth embodiment will be explained. The fourth embodiment is different from the first embodiment in that a bypass line 81 for circulating cooling water, bypassing a fuel cell 2, a shut valve 82 is provided between the downstream side of a confluence 13 and a cooling water inlet 2a of the fuel cell 2, and a shut valve 83 is provided between the upstream side of a branch point 14 and a cooling water outlet 2b of the fuel cell 2.

The bypass line 81 has one end, which is the upstream end, connected to the downstream side of the switching valve 24 in a cooling line 10, and the other end, which is the downstream end, connected to the upstream side of the cooling pump 23 in the cooling line 10. The bypass line 81 is provided with a shut valve 84 for opening/closing the bypass line 81. Each of two shut valves 82 and 83 near the fuel cell 2 is composed of, for example, an electromagnetic valve, and the opening/closing operations thereof are controlled by a controller 3. The bypass line 81 and the three shut valves 82, 83, and 84 are used to obviate a thermal shock to the fuel cell 2 caused by cooling water of an exhaust heat utilization line 11.

For instance, when starting-up the fuel cell 2, if an input of the demand for heating is supplied or not supplied to an input means 52, the controller 3 first closes the two shut valves 82 and 83 near the fuel cell 2 and opens the shut valve 84 of the bypass line 81. Thereafter, the controller 3 begins the driving of both the cooling pump 23 and an exhaust heat utilization pump 42. This causes the cooling water of the cooling line 10 and the cooling water of the exhaust heat utilization line 11 to merge at the upstream end of the bypass line 81 and to be mixed while flowing through the bypass line 81. Then, the cooling water of the bypass line 81 is branched at the downstream end of the bypass line 81 and flows back into the cooling line 10 and the exhaust heat utilization line 11, bypassing the fuel cell 2.

With this configuration, even if there is a temperature difference in cooling water between the cooling line 10 and the exhaust heat utilization line 11 or if there is a local temperature difference in cooling water in the cooling line 10 and the exhaust heat utilization line 11, the temperature of the cooling water will be leveled. And, to start the circulation of the cooling water into the fuel cell 2 after a predetermined time elapses from the start of the driving of the cooling pump 23 and the exhaust heat utilization pump 42, the two shut valves 82 and 83 near the fuel cell 2 are opened, while the shut valve 84 of the bypass line 81 is closed. Carrying out such control makes it possible to restrain a temperature change in the fuel cell 2 attributable to the cooling water of the exhaust heat utilization line 11.

When controlling the flow when starting-up the fuel cell 2, the time for which the cooling water runs in the bypass line 81 or the rotational amount of the cooling pump 23 or the exhaust heat utilization pump 42 may be controlled based on the timer or the detection results of various sensors, such as the temperature sensors 61 to 65, as with the first embodiment. Further, the same control as that in the first embodiment may be conducted to intermittently operate or to stop the fuel cell 2. The bypass line 81, which has been positioned adjacently to the cooling line 10, may be of course provided adjacently to the exhaust heat utilization line 11.

Further, the three shut valves 82 through 84 have been provided; however, the number thereof is not limited thereto. For example, one of the two shut valves 82 and 83 near the fuel cell 2 can be omitted. The bypass line 81 has been provided with the shut valve 84, however, in place of the shut valve, a switching valve, for example, that has the same structure as that of the aforesaid switching valve 24 may be provided at the junction of the bypass line 81 and the cooling line 10.

Fifth Embodiment

Figure 6:
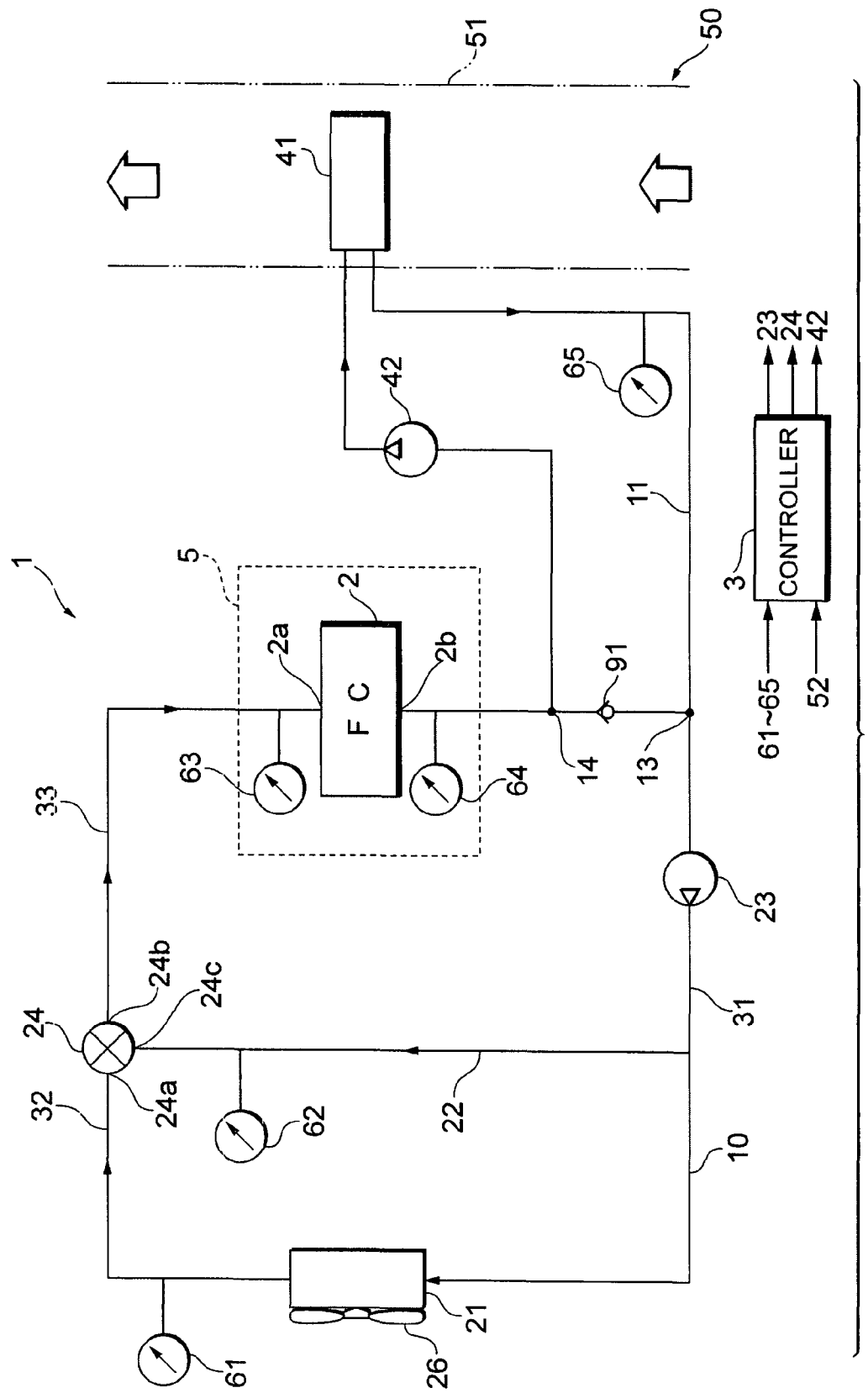
FIG. 6 is a configuration diagram showing the configuration of a fuel cell system according to a fifth embodiment.

Referring now to FIG. 6, a fuel cell system 1 according to a fifth embodiment will be explained. The present embodiment has a check valve 91 added to the fuel cell system 1 according to the third embodiment shown in FIG. 4. The check valve 91 is installed on a cooling line 10 between a confluence 13 and a branch point 14. The check valve 91 blocks the flow of cooling water from the confluence 13 to the branch point 14.

The operation of the present embodiment will be described. If an exhaust heat utilization pump 42 is driven when a cooling pump 23 is not being driven, then the cooling water that has passed through an exhaust heat utilization line 11 may partly flow from the confluence 13 to the branch point 14. The present embodiment is provided with the check valve 91, making it possible to block the flow of the cooling water from the confluence 13 to the branch point 4 and to block the inflow of the cooling water into a cooling water outlet 2b of a fuel cell 2. With this configuration, the fuel cell 2 is not subjected to a thermal shock even if the temperature of the cooling water of the exhaust heat utilization line 10 is lower than the temperature of the fuel cell 2.

The present embodiment is also capable of providing the same advantages as those of the aforesaid embodiment by carrying out the cooperative control of the cooling pump 23 and the exhaust heat utilization pump 42, as described in the third embodiment and the first embodiment. Further, the check valve 91 may alternatively be provided between the branch point 14 and the cooling water outlet 2b of the fuel cell 2.

Sixth Embodiment

Figure 7:
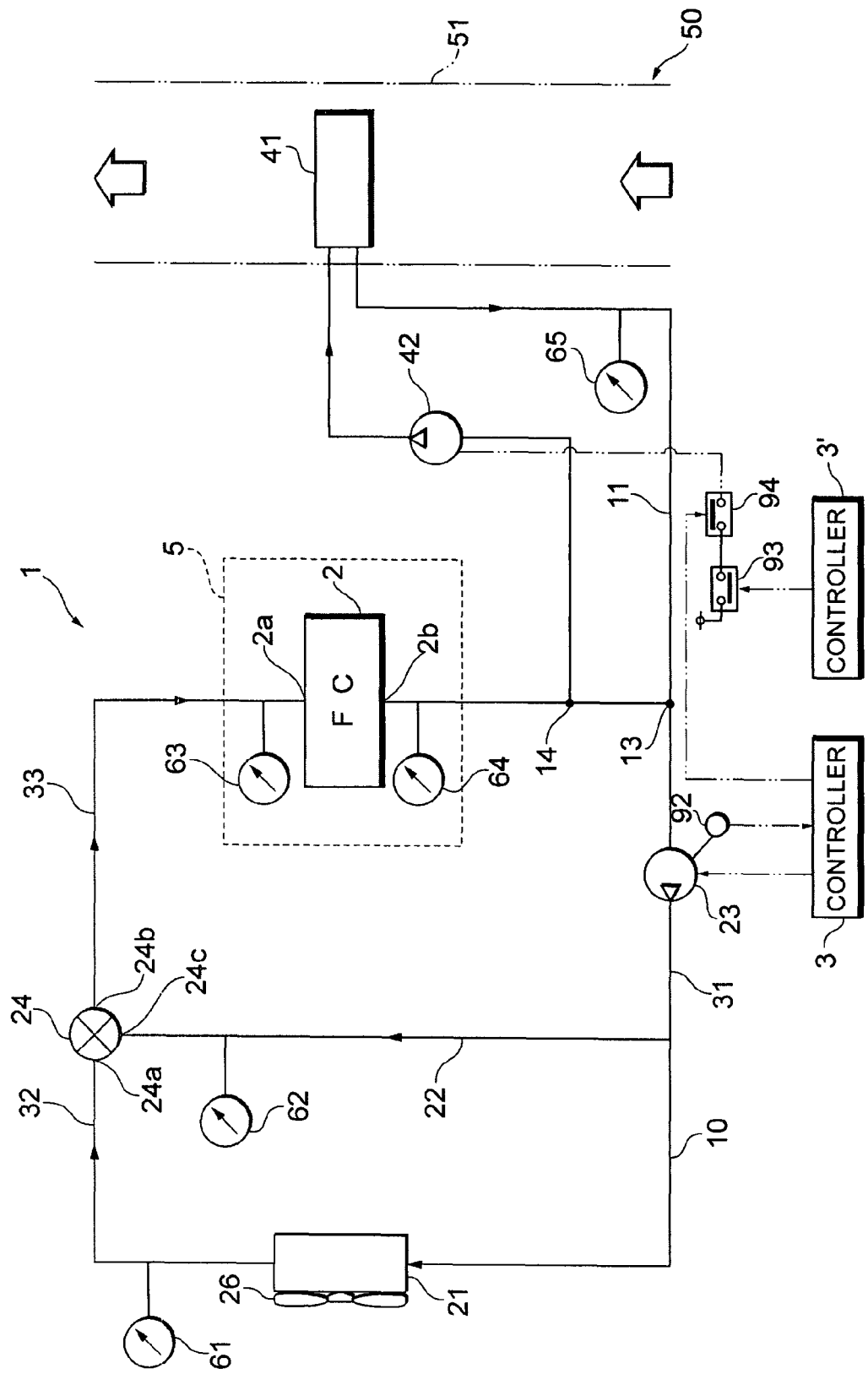
FIG. 7 is a configuration diagram showing the configuration of a fuel cell system according to a sixth embodiment.

Referring now to FIG. 7, a fuel cell system 1 according to a sixth embodiment will be explained. The present embodiment shares the same piping system with the fuel cell system 1 according to the third embodiment shown in FIG. 4, but differs in control system. To be specific, the third embodiment has the single controller 3 as one example of a control system, while the present embodiment has two controllers 3 and 3'. The two controllers 3 and 3' correspond to a part of "flow control means" or "control means" described in the claims.

One controller 3 (ECU) controls the driving of a cooling pump 23, an RPM sensor 92 of the cooling pump 23 being connected thereto. Further, the controller 3 functions as a main controller that controls also a switching valve 24, various sensors, such as temperature sensors 61 through 65, being connected thereto. The other controller (ECU) 3' controls the driving of an exhaust heat utilization pump 42. A control circuit located between the controller 3' and the exhaust heat utilization pump 42 is provided with two relays 93 and 94. The controller 3' opens/closes the relay 93, while the controller 3 opens/closes the relay 94.

The control system of the present embodiment also makes it possible to provide the same operations and advantages as those of the aforesaid embodiments. For instance, when starting-up the fuel cell 2, if the RPM sensor 92 detects that the RPM of the cooling pump 23 has reached a predetermined number or more, then the controller 3 may close the relay 94 and enable the driving of the exhaust heat utilization pump 42. And, the controller 3' may close the relay 93 and control the driving of the exhaust heat utilization pump 42. This makes it possible to restrain the cooling water of the exhaust heat utilization line 11 from flowing backward to a cooling water outlet 2b of the fuel cell 2, and to restrain a temperature change in the fuel cell 2.

Seventh Emdodiment

Figure 8:
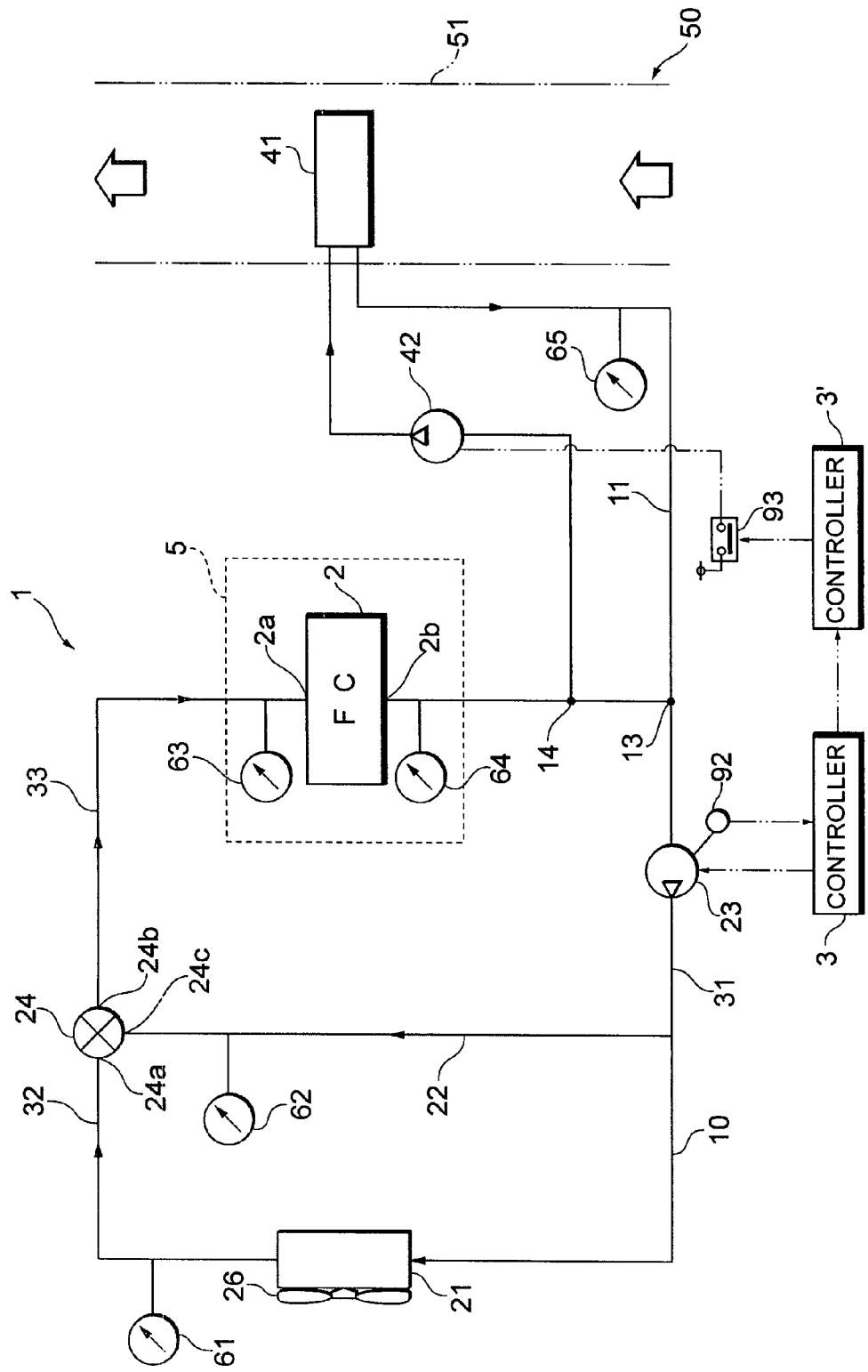
FIG. 8 is a configuration diagram showing the configuration of a fuel cell system according to a seventh embodiment.

Referring now to FIG. 8, a fuel cell system 1 according to a seventh embodiment will be explained. The seventh embodiment differs from the sixth embodiment in that a controller 3 communicates with a controller 3'. For instance, at a start-up of a fuel cell 2, the controller 3 notifies the controller 3' of a permission to drive an exhaust heat utilization pump 42, and in response thereto, the controller 3' closes a relay 93 and controls the driving of the exhaust heat utilization pump 42. Thus, the same operations and advantages as those of the sixth embodiment can be provided. An advantage over the sixth embodiment is that the relay (94) is no longer necessary, thus permitting reduced cost to be achieved.

In each of the aforesaid embodiments, the heat energy of exhaust heat of the fuel cell 2 has been used for heating; however, if the fuel cell system 1 is, for example, a fixed type, then the heat energy of the exhaust heat of the fuel cell 2 can be used for hot-water supply or bath. In such a case, a heat exchanger for heating (a heater core 41) of the exhaust heat utilization line 11 heat-exchanges with a medium other than an air conditioning gas. Controlling the flow of cooling water in the same manner as described above is effective for the fuel cell 2.

Eighth Embodiment

Figure 9:
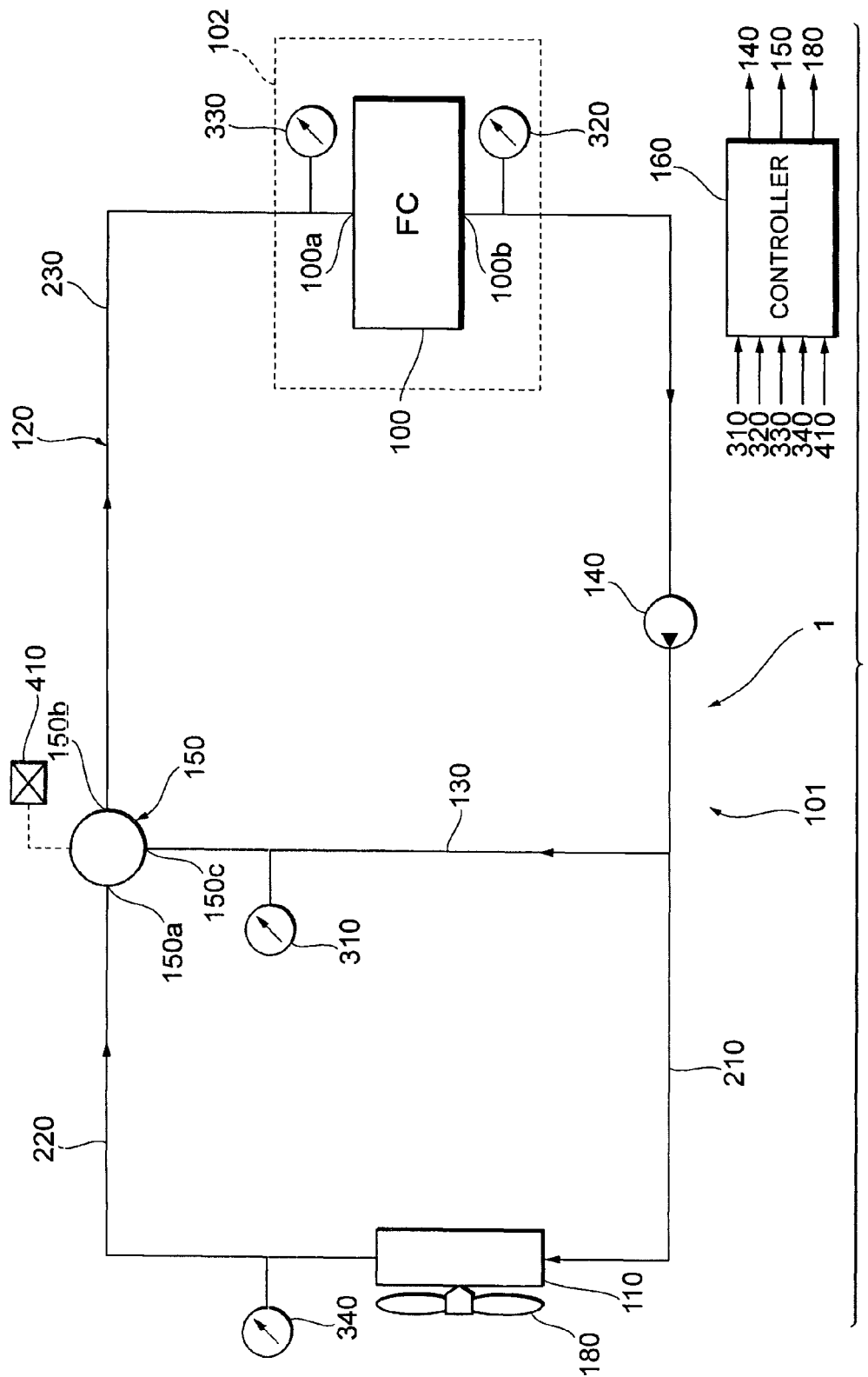
FIG. 9 is a configuration diagram showing a cooling apparatus for a fuel cell provided in a fuel cell system according to an eighth embodiment.

FIG. 9 is a system diagram showing a cooling apparatus for a fuel cell, which is a part of a fuel cell system 1. A fuel cell 100 to which fuel gas and oxidant gas are supplied has a stack structure composed of a laminate of multiple unit cells, which are basic units. The fuel cell 100 is housed, together with a peripheral detecting device and the like, in a stack case 200. The stack case 200 is formed of a metal or hard resin material and fixed to the bottom of the floor or the like of a vehicle interior through the intermediary of a bracket or the like.

The fuel cell 100 comes in a plurality of types, including a phosphoric-acid type; the fuel cell in the present embodiment is composed of a solid polymer electrolytic type, which is ideally suited for installation in a vehicle. Although not shown, a unit cell of the fuel cell 100 is formed by an MEA (Membrane Electrode Assembly) sandwiched between a pair of separators made of a metal or the like. As inner flow passages of the stack-structured fuel cell 100, a flow passage of fuel gas, a flow passage of oxidant gas, and a flow passage of cooling water are provided. These flow passages are formed primarily in the planes of the separators. The fuel cell 100 is cooled by the cooling water serving as a refrigerant flowing through the inner flow passages by a cooling apparatus 101.

The cooling apparatus 101 includes a radiator 110 which cools cooling water discharged from a fuel cell 100, a circulation passage 120 through which the cooling water is circulated between the radiator 110 and the fuel cell 100, a bypass passage 130 for bypassing the radiator 110, a pump 140 which is positioned on the circulation passage 120 at the downstream side of the fuel cell 100 and which pressure-feeds cooling water, a fluidic valve 150 which sets the flow of cooling water to the radiator 110 and the bypass passage 130, and a controller 160 which overall controls the entire cooling apparatus 101. The circulation passage 120 and the bypass passage 130 function as a refrigerant circulation system which circulatively supplies a refrigerant to the fuel cell.

The radiator 110 (a heat exchanger) has therein a passage that leads the cooling water whose temperature has risen due to an electric generation reaction of the fuel cell 100, and the heat of the cooling water is dissipated outside when the cooling water passes through the passage. The radiator 110 is provided, for example, on the front of a vehicle. The radiator 110 is also provided with a fan 180 for blowing outside air to the passage in the radiator 110. The fan 180 accelerates the cooling of the cooling water in the radiator 110. The fan 180 is connected to the controller 160 and the drive thereof is controlled by the controller 160.

The circulation passage 120 is composed primarily of a first passage 210 from a cooling water outlet 100b of the fuel cell 100 to an inlet of the radiator 110, a second passage 220 from an outlet of the radiator 110 to a first port 150a of the fluidic valve 150, and a third passage 230 from a second port 150b of the fluidic valve 150 to a cooling water inlet 100a of the fuel cell 100.

The upstream end of the bypass passage 130 is connected to the downstream end of the pump 140 of the first passage 210, while the downstream end thereof is connected to a third port 150c of the fluidic valve 150. The bypass passage 130 is composed of a tube having an inside diameter that is smaller than or equal to that of the circulation passage 120. The bypass passage 130 is provided with no auxiliary device having a cooling effect. The cooling water flows into the bypass passage 130 from the first passage 210 of the circulation passage 120, bypassing the radiator 110. Subsequently, the cooling water that has passed through the bypass passage 130 passes through the third passage 230 via the fluidic valve 150 and then flows into the fuel cell 100.

The circulation passage 120 and the bypass passage 130 are provided with a plurality of temperature sensors 310, 320, 330, and 340 along these passages in a scattered manner. To be specific, the bypass passage 130 is provided with the single temperature sensor 310 near the fluidic valve 150. The plurality of temperature sensors 320, 330, and 340 on the circulation passage 120 are provided at a cooling water inlet 100a of the fuel cell 100, a cooling water outlet 100b thereof, and at the downstream side of the radiator 110. The temperature sensors 320 and 330 near the cooling water inlet 100a and the cooling water outlet 100b of the fuel cell 100 are housed in a stack case 200. However, these temperature sensors 320 and 330 may be provided outside the stack case 200.

The temperature sensor 330 (a first temperature sensor) at the cooling water outlet 100b detects a temperature that reflects the temperature of the cooling water in the fuel cell 100. Further, the temperature sensor 340 (a second temperature sensor) on the downstream side of the radiator 110 detects a temperature that reflects the temperature of the cooling water at the outlet of the radiator 110. These plural temperature sensors 310 to 340 are connected to the controller 160, and supply their detection results to the controller 160.

The pump 140 is connected to the controller 160 and the driving thereof is controlled by the controller 160. When the driving of the pump 40 is begun, the cooling water in the circulation passage 120 flows and circulates to the radiator 110 and/or the bypass passage 130. Thus, temperature control is carried out such that the temperature of the fuel cell 100 is maintained within a predetermined range, and the electric generation reaction of the fuel cell 100 efficiently proceeds. When the driving of the pump 140 is stopped, the flow of the cooling water in the circulation passage 120 stops. The pump 140 has been positioned at the upstream side of the radiator 110 and the fluidic valve 150; it is obvious, however, the pump 140 may alternatively be positioned at the downstream side of the radiator 110 and the fluidic valve 150.

The fluidic valve 150 has a three-way valve structure having the first port 150a, the second port 150b, and the third port 150c. The fluidic valve 150 is configured to allow the cooling water to be switched to one of the radiator 110 and the bypass passage 130 or to both of them. For instance, if the fluidic valve 150 is completely changed over to the bypass passage 130, then the cooling water not subjected to the heat dissipation effect by the radiator 110 will flow into the fuel cell 100.

Further, the fluidic valve 150 is configured such that the opening degree of the valve can be adjusted, thus making it possible to adjust the inflow amount of the cooling water into the radiator 110 and the bypass passage 130. For example, as the opening degrees of the fluidic valve 150, the opening degree for the radiator 110 may be set to 10%, while the opening degree for the bypass passage 130 may be set to 90%. Thus, the fluidic valve 150 functions as a switching means for switching the flow of the cooling water between the radiator 110 and the bypass passage 130, and also makes it possible to vary the opening degree for the flow.

Hereinafter, the following abbreviations, such as "radi fully opened (the radiation fully opened)" and "bypass fully opened," will be frequently used in the explanation. The "radi fully opened" means that the fluidic valve 150 is fully opened to the radiator 110 while it is fully closed from the bypass passage 130. In the "radi fully opened" condition, the cooling water that has passed through the radiator 110 is supplied to the fuel cell 100, while the supply of the cooling water in the bypass passage 130 to the fuel cell 100 is shut off. Similarly, "the bypass fully opened" means that the fluidic valve 150 is fully opened to the bypass passage 130, while it is fully closed from the radiator 110. In "the bypass fully opened" condition, the cooling water that has passed through the bypass passage 130 is supplied to the fuel cell 100, while the supply of the cooling water that has passed through the radiator 110 is shut off.

The fluidic valve 150 is connected to the controller 160, and the opening degree of the valve, including a switching operation, is controlled by output signals from the controller 160. This type of fluidic valve 150 may be composed of, for example, an electromagnetic valve type driven by a solenoid, a motor-operated valve type driven by a motor, or a type driven by electric/magnetic forces of a piezoelectric element or a magnetostrictive element. Incidentally, the fluidic valve 150 is ideally formed of a rotary valve, as will be discussed later in other embodiments.

Reference numeral 410 in the figure denotes a position sensor built in the fluidic valve 150. The position sensor 410 detects the position of the valving-element of the fluidic valve 150, i.e., the opening degree of the valve. A detection result of the position sensor 410 is input to the controller 160.

Generally, a drift or the like of the position sensor 410 may lead to deteriorated accuracy thereof, so that the fluidic valve 150 is subjected to zero point adjustment to reset the position sensor 410. The zero point adjustment is usually performed at a start-up of the fuel cell 100 (at a start-up of the fuel cell system 1). Carrying out the zero point adjustment eliminates, from the fluidic valve 150, the difference between an opening degree based on a command value of the controller 160 and an actual opening degree set on the basis of the command before the fuel cell 100 is actually actuated. This allows the opening degree of the fluidic valve 150 to be controlled with high accuracy when the fuel cell 100 generates electric power.

The controller 160 (ECU) has mainly a CPU, a ROM storing control programs and control data to be processed by the CPU, and a RAM used as various work areas primarily for control processing, none of which are shown. The controller 160 receives detection signals from various sensors, including the plurality of temperature sensors 310 to 340 and the position sensor 410. Further, the controller 160 outputs control signals to various drivers to control the pump 140, the fluidic valve 150, etc., thereby integrally controlling the entire cooling apparatus 101. From another viewpoint, the controller 160 functions, in cooperation with the pump 140 and the fluidic valve 150, as a flow control means for restraining the cooling water that has a predetermined temperature difference from that of the fuel cell 2 from flowing into the fuel cell 2.

Figure 10:
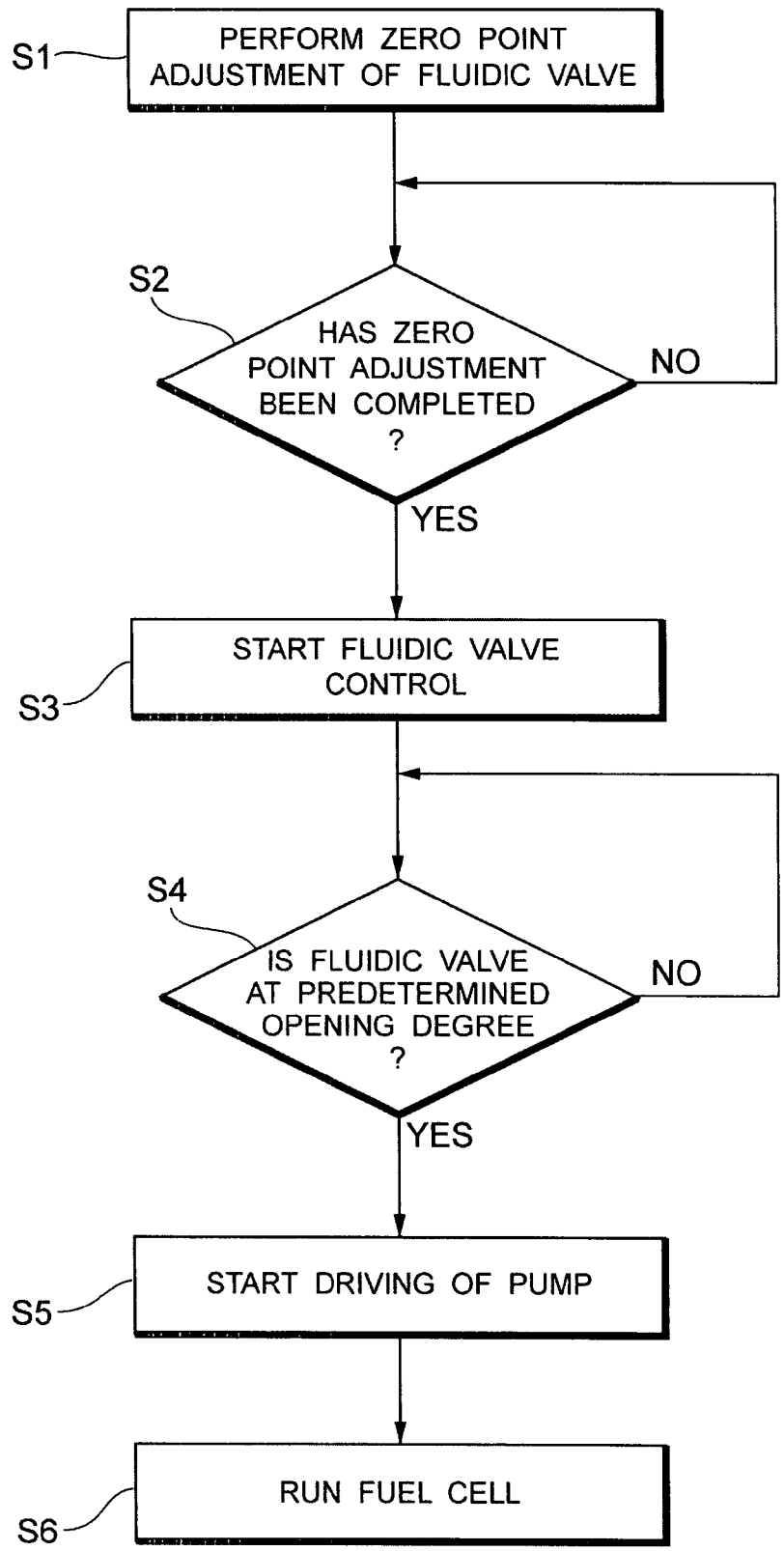
FIG. 10 is a flowchart illustrating the processing flow of the cooling apparatus for the fuel cell according to the eighth embodiment when starting-up the fuel cell.

FIG. 10 is a flowchart which shows the processing flow of the cooling apparatus 101 when the fuel cell 100 is started up. When starting-up the fuel cell 100, first, the zero point adjustment of the fluidic valve 150 is performed (S1). The zero point adjustment is performed by moving the valving-element of the fluidic valve 150 by the controller 160 to drive a driving source, such as a motor, of the fluidic valve 150 for a predetermined time until the movement of the valving-element is restricted by a movement end position. The fluidic valve 150 in the present embodiment is a switching valve, so that the fluidic valve 150 is controlled by the controller 160 until the fluidic valve 150 is fully switched to one of the radiator 110 and the bypass passage 130.

For example, the zero point adjustment is implemented until "the radi fully opened" is maintained as a state of the fluidic valve 150 for a predetermined time (S2; No). Performing the zero point adjustment at the radi fully opened side makes it possible to supply the cooling water whose temperature has been lowered by the radiator 110 to the fuel cell 100 when the fuel cell 100 generates electric power even if the fluidic valve 150 fails by being stuck during the zero point adjustment. This prevents the fuel cell 100 from overheating, thus achieving fail-safe.

Alternatively, the zero point adjustment may be performed with "the bypass fully opened" rather than "the radi fully opened." In this case also, the zero point adjustment is performed until the bypass fully opened is maintained as a state of the fluidic valve 150 for a predetermined time (S2; No). This allows the opening degree of the fluidic valve 150 to be promptly set when the bypass fully opened is required as the opening degree of the fluidic valve 150 or when an opening degree that is close to the bypass fully open is required after the zero point adjustment. Actually, as will be discussed later, if there is a large temperature difference in cooling water between the radiator 110 and the fuel cell 100, then the fluidic valve 150 is set to the bypass fully opened; it is therefore useful to perform the zero point adjustment with the bypass fully opened.

After completion of the zero point adjustment (S2; Yes), the control of the fluidic valve 150 is begun (S3). The control of the fluidic valve 150 is carried out by changing the opening degree of the fluidic valve 150 to a predetermined opening degree from the opening degree after the zero point adjustment (the radi fully opened or the bypass fully opened) according to a command of the controller 160. If, however, the zero point adjustment is not performed, then the fluidic valve 150 is changed from an initial opening degree before the fuel cell 100 is started to a predetermined opening degree.

More specifically, "the initial opening degree" in the present document refers to an opening degree of the fluidic valve 150 immediately before executing the processing flow for starting up the fuel cell 100, and in steps S3 to S4, the opening degree of the fluidic valve 150 is changed from the initial opening degree to a predetermined opening degree via the opening degree obtained after the zero point adjustment. A specific example of "the initial opening degree" will be described later in a ninth embodiment.

Further, "the predetermined opening degree" refers to an opening degree suited to specifications that does not cause a sudden temperature change in the fuel cell 100 due to the cooling water that starts to flow into the fuel cell 100 in a subsequent step. The "predetermined opening degree" may be an opening degree stored beforehand in the ROM of the controller 160 or an opening degree set based on a soak time of the fuel cell system 1 (time for which the fuel cell 100 is let stand at a stop). Regarding the latter, for example, the time from a stop of the fuel cell 100 to the next start-up is measured by a timer incorporated in the controller 160, and the predetermined opening degree is set based on the length of the soak time.

More in detail, if the soak time is relatively long, then time that is adequate for the cooling water to dissipate heat elapses. For this reason, the temperatures of the cooling water in the radiator 110 and the cooling water in the fuel cell 100 become equal. In this case, the opening degree of the fluidic valve 150 when starting-up the fuel cell 100 is not a problem, in particular, in relation to a temperature change in the fuel cell 100. Hence, the predetermined opening degree of the fluidic valve 150 can be arbitrarily set. Preferably, the predetermined opening degree of the fluidic valve 150 is set to the bypass passage 130 side, such as "the bypass fully opened," thus allowing the warm-up time of the fuel cell 100 to be shortened.

Meanwhile, if the soak time is relatively short, a difference occurs in the radiation amount of cooling water between the fuel cell 100 inside the stack case 200 and the radiator 110 outside the stack case 200, and the temperature of the cooling water in the radiator 110 will be lower than that of the fuel cell 100. In this case, therefore, setting the predetermined opening degree of the fluidic valve 150 to the bypass passage 130 side, such as "the bypass fully opened," makes it possible to prevent the cooling water in the radiator 110 from flowing into the fuel cell 100. Thus, a temperature change in the fuel cell 100 can be suppressed.

And preferably, in cooperation with or independently of a timer, the predetermined opening degree of the fluidic valve 150 is set based on the temperature sensors 310, 320, 330, and 340. For example, the heat radiation condition of the cooling water at each portion varies depending on the environment in which a fuel-cell vehicle is placed, so that the fluidic valve 150 is set to the predetermined opening degree on the basis of the detection results of the plurality of temperature sensors 310, 320, 330, and 340 that detect the temperature of cooling water rather than uniquely setting the fluidic valve 150 to the predetermined opening degree by a timer. This makes it possible to further suppress a temperature change in the fuel cell 100.

To be specific, the fluidic valve 150 is set to a predetermined opening degree based on a temperature difference between the cooling water in the fuel cell 100 and the cooling water in the radiator 110 according to the detection results of the temperature sensor 330 and the temperature sensor 340, in particular, of the fuel cell 100 among the plurality of temperature sensors 310 to 340. For instance, if the temperature difference exceeds a first predetermined threshold value, then "the bypass fully opened" is set as the predetermined opening degree. If the temperature difference is not more than a second predetermined threshold value, which is lower than the first predetermined threshold value, then any opening degree, such as "the radi fully opened," may be set as the predetermined opening degree.

However, the cooling water may circulate through both the bypass passage 130 and the radiator 110 whether a temperature difference is the first predetermined threshold value or more or the second predetermined threshold value or less. In this case, the circulation ratio (flow rate ratio) may be set, as necessary. Further, the fluidic valve 150 may be set to a predetermined opening degree based on one temperature sensor (one of 310 to 340) in addition to a temperature difference of detection results.

After the fluidic valve 150 is changed to the predetermined opening degree (S4; Yes), the driving of the pump 140 is begun based on the command of the controller 160 (S5). The timing at which the driving of the pump 140 is begun may be immediately after or at the same time the fluidic valve 150 is changed to a predetermined opening degree. In other words, the processing for changing the opening degree of the fluidic valve 150 is required to be completed before the processing for starting the driving of the pump 140 is executed. When the driving of the pump 140 is begun, the cooling water is supplied to the fuel cell 100 through the intermediary of the fluidic valve 150 set to the predetermined opening degree and the operation (the generation of electric power) of the fuel cell 100 is begun (S6).

As described above, according to the cooling apparatus 101 provided in the fuel cell system 1, when starting-up the fuel cell 100, the fluidic valve 150 is set to the predetermined opening degree preferentially over the start of the driving of the pump 140. Thus, a temperature change in the fuel cell 100 can be ideally restrained. This makes it possible to obviate thermal influences, such as the distortion of the separators caused by thermal shocks, when starting-up the fuel cell 100, permitting higher reliability of the fuel cell 100 to be achieved. Moreover, since the zero point adjustment of the fluidic valve 150 is performed, the opening degree of the fluidic valve 150 can be controlled, as necessary, to the bypass passage 130 or the radiator 110 with high accuracy while the fuel cell 100 is generating electric power.

In the present embodiment, the zero point adjustment of the fluidic valve 150 has been carried out; however, if the fluidic valve 150 is a high-accuracy valve, then it is unnecessary to perform the zero point adjustment. Further, the fluidic valve 150 has been provided at the downstream side of the radiator 110; alternatively, however, the fluidic valve 150 may be provided at the upstream side of the radiator 110.

Ninth Embodiment

Figure 11:
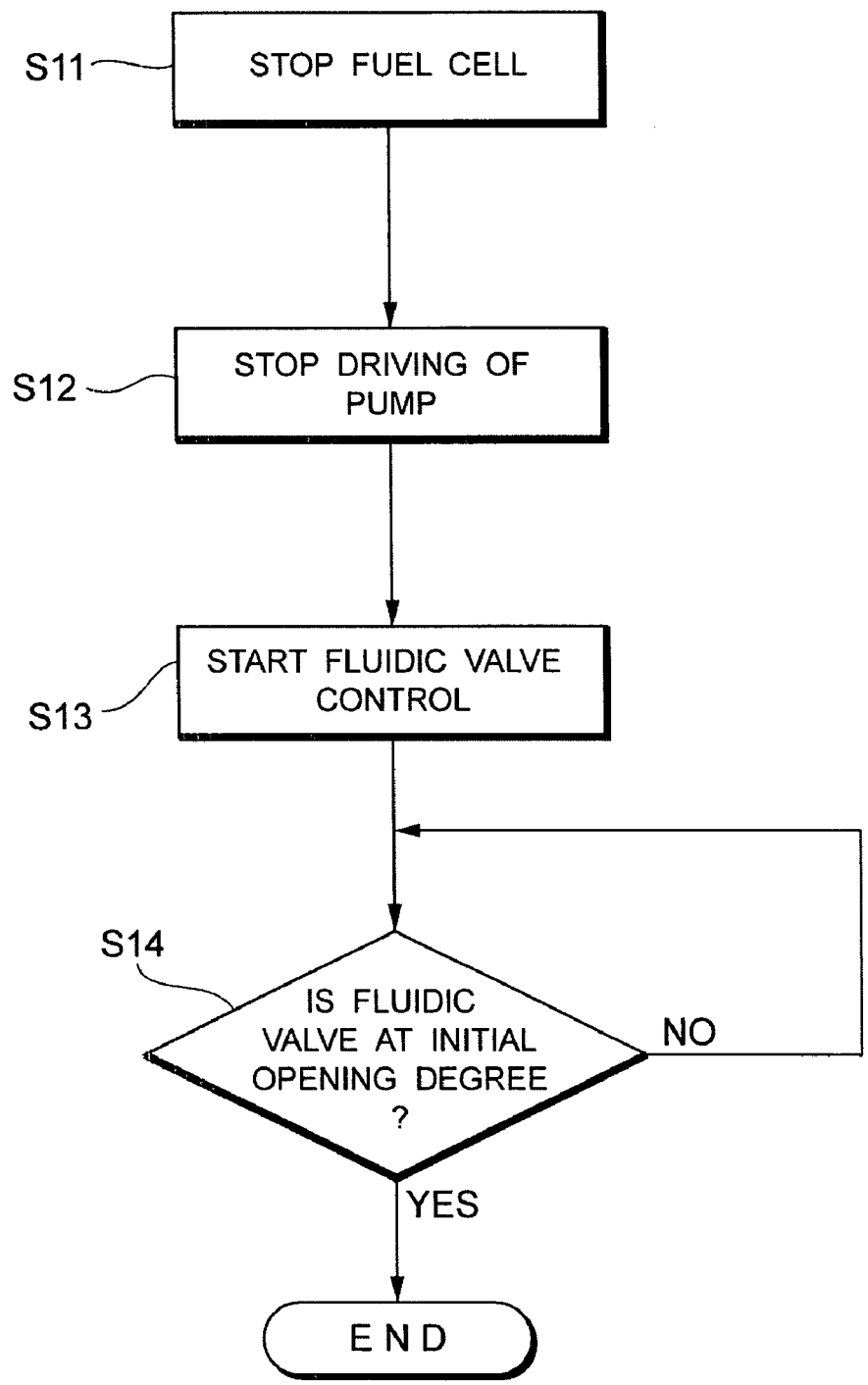
FIG. 11 is a flowchart illustrating the processing flow of the cooling apparatus for the fuel cell according to a ninth embodiment at a stop of the fuel cell.

A cooling apparatus 101 in a fuel cell system 1 according to a ninth embodiment will be explained. FIG. 11 is a flowchart which shows the processing flow of the cooling apparatus 101 when a fuel cell 100 is stopped. As shown in the figure, when the operation of the fuel cell 100 is stopped (S11), first, the driving of a pump 140 is stopped by a controller 160 (S12).

Subsequently, the control of a fluidic valve 150 is begun (S13). The control of the fluidic valve 150 is implemented by changing the opening degree of the fluidic valve 150 from the opening degree before the stop to the aforesaid "initial opening degree" by the command of the controller 160.

Here, if the fluidic valve 150 is set to an opening degree which includes "the radi fully opened" that allows cooling water to flow into the radiator 110, as an initial opening degree, then the natural heat dissipation of the cooling water in the fuel cell 100 can be accelerated at a stop of the fuel cell 100. Moreover, the aforesaid zero point adjustment on "the radi fully opened" side can be promptly performed. Alternatively, the initial opening degree may be set to an opening degree, which includes "the bypass fully opened," at which the fluidic valve 150 allows cooling water to flow into a bypass passage 130. This makes it possible to promptly perform the zero point adjustment on "the bypass fully opened" side.

Further, as an alternative of the aforesaid opening degrees, the initial opening degree may be set to an opening degree at which the fluidic valve 150 allows a refrigerant to circulate into both the radiator 110 and the bypass passage 130. The ratio of both in this case may be set, as appropriate. Setting to this opening degree makes it possible to restrain the fuel cell 100 engaged in an electricity generating operation from over-cooling and overheating if the fluidic valve 150 fails, thus permitting fail-safe to be ideally achieved. Moreover, the zero point adjustment can be promptly performed to both "the radi fully opened" and "the bypass fully opened." When the initial opening degree of the fluidic valve 150 is set, the processing flow is finished (S14; Yes).

Then, when the fuel cell 100 is restarted in a predetermined stop time of the fuel cell 100, the cooling apparatus 101 is driven according to the flow shown in FIG. 10. More specifically, when an attention is focused on the fluidic valve 150, the opening degree of the fluidic valve 150 is changed from "the initial opening degree" set at a stop of the fuel cell 100 to a zero-point-adjustment opening degree and then to "a predetermined opening degree" thereafter.

Tenth Embodiment

Figure 12:
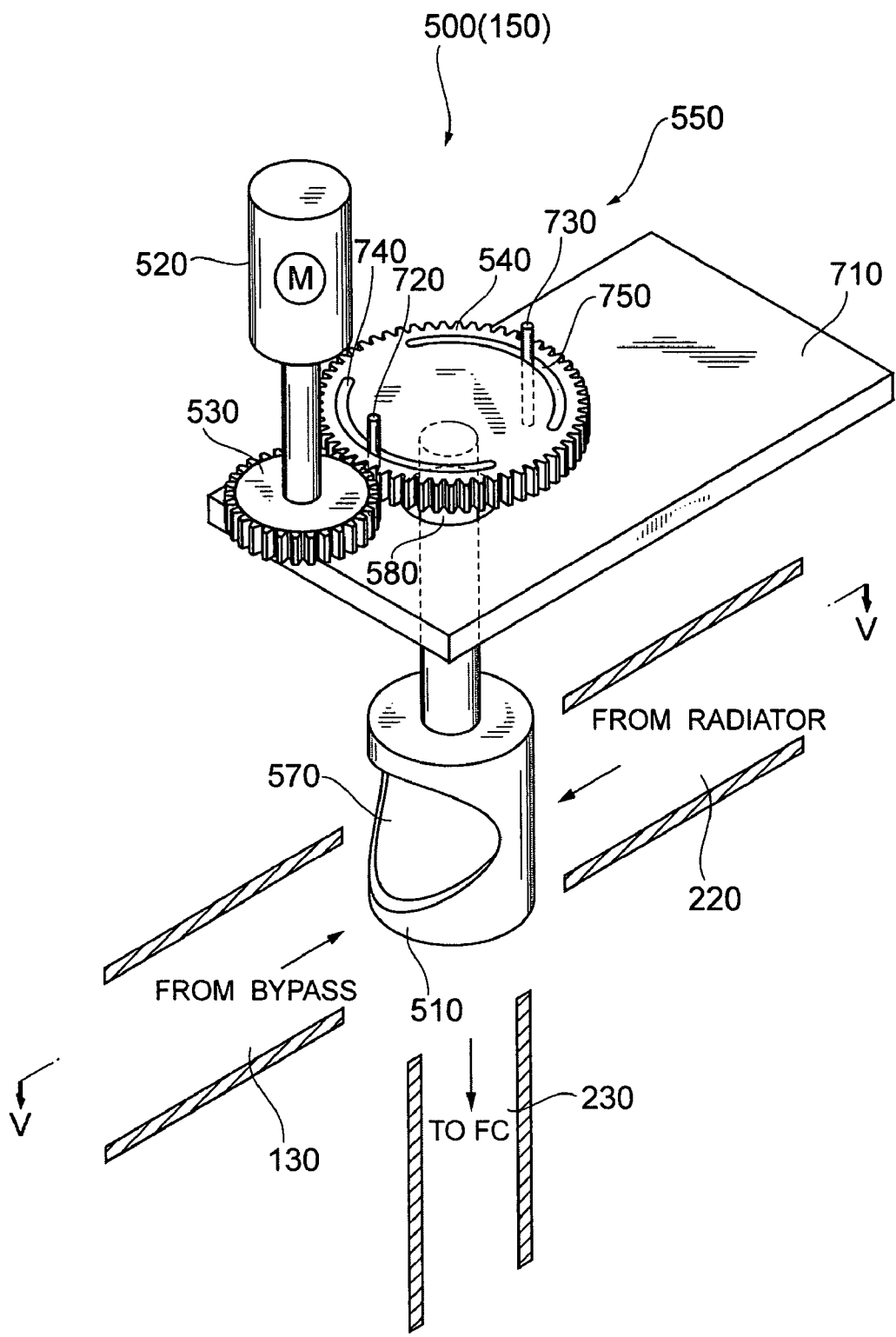
FIG. 12 is a perspective view schematically showing a rotary valve as a fluidic valve in a tenth embodiment.

Referring now to FIGS. 12 and 13, a configuration example of a fluidic valve 150 will be explained as a tenth embodiment of a cooling apparatus 101 in a fuel cell system 1 in accordance with the present invention. The fluidic valve 150 in the present embodiment is constituted of a rotary valve 500 whose valve opening degree is adjustable in an electrical control manner. The fluidic valve 150 constituted of the rotary valve 500 makes it possible to properly and accurately deal with a fuel cell 100, which is sensitive to temperature control.

FIG. 12 shows an essential part of the internal structure of the rotary valve 500. A valving-element 510 in the rotary valve 500 is positioned at a confluence of a second passage 220 from a radiator 110, a bypass passage 130, and a third passage 230 in communication with the fuel cell 100. The rotary valve 500 has a stepping motor 520 serving as a driving source for rotating the valving-element 510, a train of gears 530 and 540, which transmits a motive power from the stepping motor 520 to the valving-element 510, and a position restricting mechanism 550 that restricts an end position of the rotation of the valving-element 510.

The valving-element 510 has an opening 570 in the circumferential direction, which provides variable communication between the second passage 220 and the third passage 230 or between the bypass passage 130 and the third passage 230. The upper central portion of the valving-element 510 is coaxially connected, through the intermediary of a rod 580, to the central portion of the bottom surface of the final gear 540 of the train of gears 530 and 540. The position of the opening 570 changes as the valving-element 510 rotates, and the rotary valve 500 is set at an opening degree based on the position of the opening 570 at which the rotation of the valving-element 510 stops.

FIG. 13(A) shows a state of the rotary valve 500 at "the bypass fully opened." In this state, the opening 570 of the valving-element 510 faces the bypass passage 130, causing the bypass passage 130 to be in communication with the third passage 230. FIG. 13(B) illustrates the state of the rotary valve 500 at "the radi fully opened." In this state, the opening 570 of the valving-element 510 faces the second passage 220 adjacent to the radiator 110, causing the second passage 220 and the third passage 230 to be in communication. FIG. 13(C) illustrates the state in which one half of the opening 570 of the valving-element 510 faces the bypass passage 130, while the remaining half of the opening 570 faces the second passage 220. In this state, both the bypass passage 130 and the second passage 220 are in communication with the third passage 230.

The stepping motor 520 is connected to the controller 160 and configured such that it may be driven and rotated in normal and reverse directions. For instance, if the stepping motor 520 is driven and rotated in the normal direction, then the valving-element 510 is rotated in the normal direction and the opening degree of the rotary valve 500 is shifted toward "the bypass fully opened." Meanwhile, if the stepping motor 520 is driven and rotated in the reverse direction, then the valving-element 510 is rotated in the negative direction and the opening degree of the rotary valve 500 is shifted toward "the radi fully opened." Controlling the number of steps of the stepping motor 520 allows the opening 570 of the valving-element 510 to be moved to a desired position (opening degree).

The position restricting mechanism 550 has a base 710, two stoppers 720 and 730 vertically provided on the base 710, and two restricting slots 740 and 750 formed by cutting through the final gear 540. The base 710 has a through hole for inserting the rod 580 therein. The two restricting slots 740 and 750 are provided such that they oppose each other, sandwiching the center of the final gear 540 therebetween, and they are formed by arc-shaped slots having the aforesaid center as their center of curvature. The stoppers 720 and 730 are inserted in the two restricting slots 740 and 750, respectively, and the stoppers 720 and 730 are configured so that they may slide within the restricting slots 740 and 750. Abutting of the stoppers 720 and 730 against the inner ends of the restricting slots 740 and 750 restricts the end position of the rotation of the valving-element 510. The position restricting mechanism 550 functions when performing the zero point adjustment of the rotary valve 500.

To be specific, to implement the zero point adjustment on "the bypass fully opened" side, the stepping motor 520 is driven and rotated in the normal direction to cause the stopper 720 inserted in the restricting slot 740 to abut against an end of the restricting slot 740. This is maintained for a predetermined time to complete the zero point adjustment (refer to S2 of FIG. 10). Similarly, to perform the zero point adjustment on "the radi fully opened," the stepping motor 520 is driven and rotated in the reverse direction, and the stopper 730 inserted in the other restricting slot 750 is abutted against an end of the restricting slot 750. By maintaining this for a predetermined time, the zero point adjustment is completed (again, refer to S2 in FIG. 10).

Incidentally, although a position sensor (the position sensor 410 in the eighth embodiment) that is reset in the zero point adjustment has not been shown, the position sensor may be composed of, for example, an optical rotary encoder. In this case, a rotary plate with slits of the rotary encoder may be provided coaxially with the final gear 540, optical paths of a light receiving element and a light emitting element may be provided, facing the slits of the rotary plate, and these two elements may be connected to the controller 160.

Eleventh Embodiment

Figure 14:
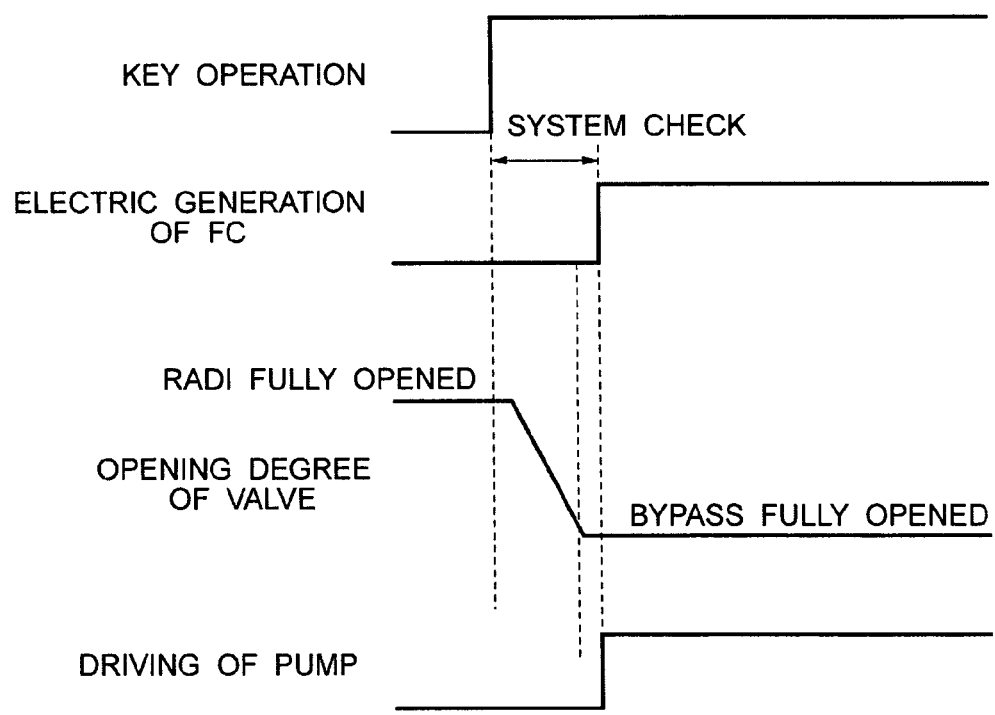
FIG. 14 is a time chart of a cooling apparatus for a fuel cell according to an eleventh embodiment.

Referring now to FIG. 14, a cooling apparatus 101 in a fuel cell system 1 according to an eleventh embodiment will be explained. FIG. 14 shows an example of a time chart of the cooling apparatus 101 at a start-up of a fuel cell 100.

"Key operation" shown in FIG. 14 refers to an operation of operation means for starting up the fuel cell system 1, and refers to, for example, a key operation for driving a fuel-cell vehicle. "Valve opening degree" means the opening degree of the fluidic valve 150.

In the present embodiment, the opening degree (initial opening degree) of the fluidic valve 150 at a stop of the fuel cell 100 is set to "the radi fully opened." When the key operation is performed to start up the fuel cell system 1, the fluidic valve 150 is controlled in response thereto by making the zero point adjustment of the fluidic valve 150 on the "bypass fully opened" side. If the fluidic valve 150 is the rotary valve 500 in the tenth embodiment, then the zero point adjustment is performed by abutting the stopper 720 (or 730).

After system check for the fuel cell system 1, such as checking whether the zero point adjustment has been completed, the generation of electric power of a fuel cell 100 is begun, and in synchronization therewith, the driving of the pump 140 is begun. In other words, according to the present embodiment, the aforesaid "predetermined opening degree" of the fluidic valve 150 is the bypass fully opened. This configuration makes it possible to provide the advantages explained in the aforesaid embodiments (the eighth to the tenth embodiments), including the capability of ideally restraining a temperature change in the fuel cell 100 when starting up the fuel cell 100.

Twelfth Embodiment

Figure 15:
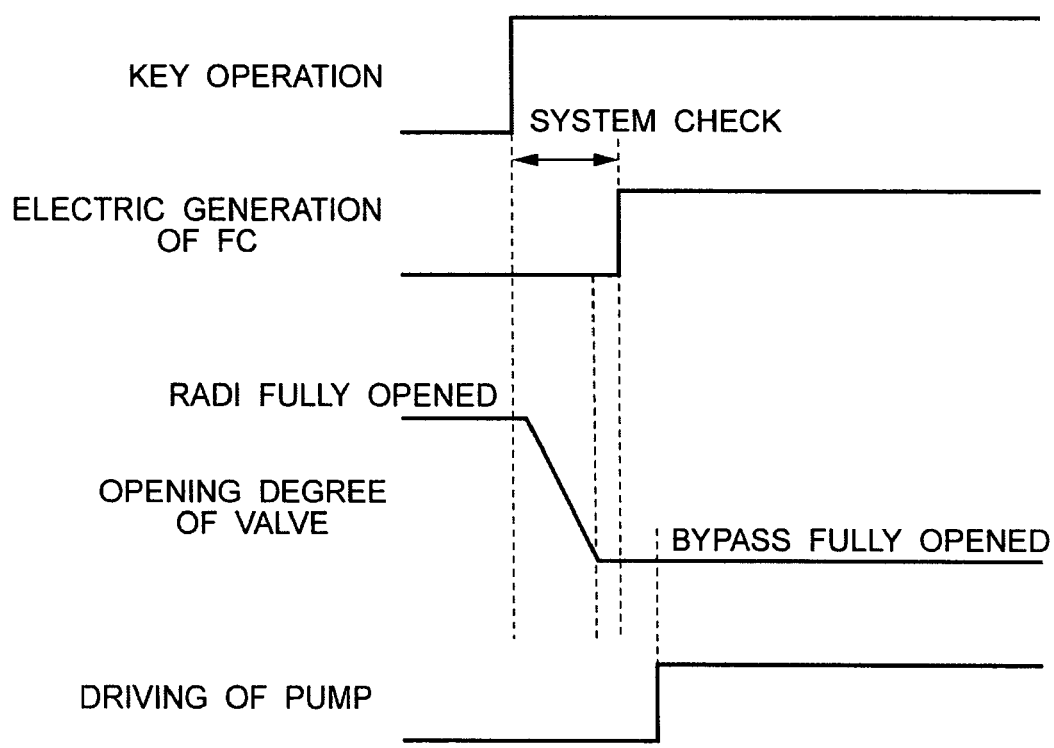
FIG. 15 is a time chart of a cooling apparatus for a fuel cell according to a twelfth embodiment.

FIG. 15 shows a twelfth embodiment of a cooling apparatus 101 in a fuel cell system 1. The twelfth embodiment is a modification example of the eleventh embodiment. A different aspect from the eleventh embodiment is that the timing at which the driving of the pump 140 is begun is slightly delayed from that in the eleventh embodiment. More specifically, the driving of the pump 140 is begun in a predetermined time after the zero point adjustment of the fluidic valve 150 is completed and the generation of electric power by the fuel cell 100 is begun. The present embodiment is useful in a case where the zero point adjustment takes a relatively long time.

Thirteenth Embodiment

Figure 16:
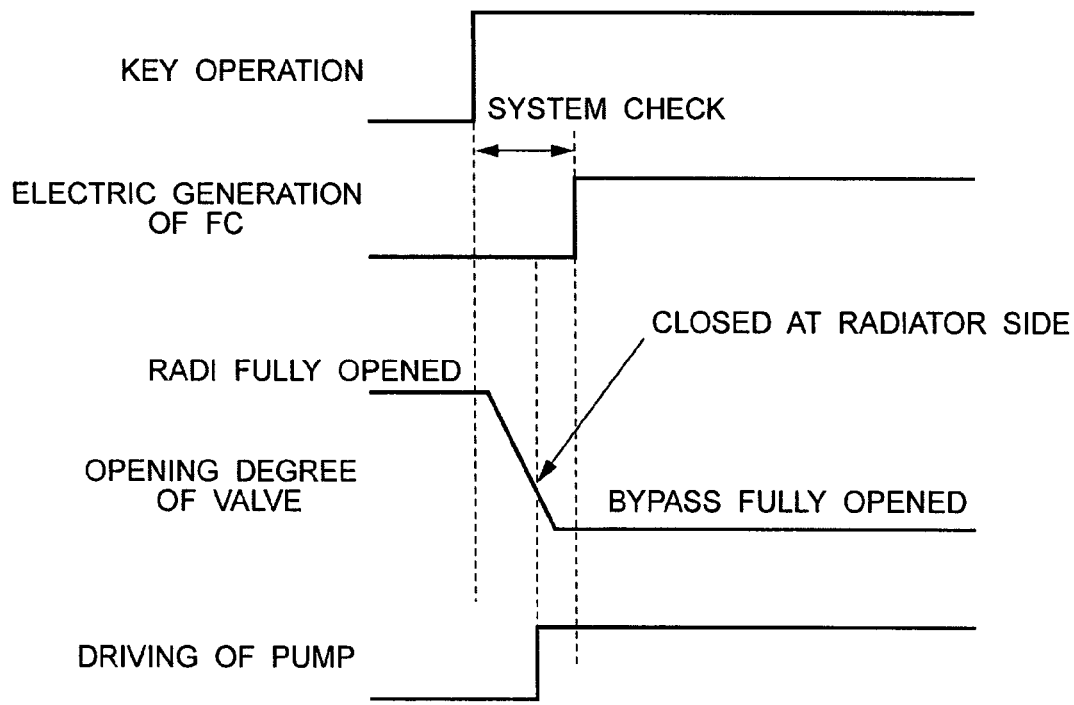
FIG. 16 is a time chart of a cooling apparatus for a fuel cell according to a thirteenth embodiment.

FIG. 16 shows a thirteenth embodiment of a cooling apparatus 101 in a fuel cell system 1. The thirteenth embodiment is a modification example of the eleventh embodiment. A different aspect from the eleventh embodiment is the timing at which the driving of a pump 140 is begun.

To be specific, the driving of the pump 140 is begun in the middle of zero point adjustment for setting the fluidic valve 150 from "the radi fully opened," which is an initial opening degree, to "the bypass fully opened." The driving of the pump 140 is begun at the timing when the fluidic valve 150 shuts off the flow of cooling water to the radiator 110. If the fluidic valve 150 is, for example, the rotary valve 500 in the tenth embodiment, then the timing is the instant when the opening 570 of the valving-element 510 reaches a position off the second passage 220 adjacent to the radiator 110.

The timing at which the driving of the pump 140 is begun is before the opening degree of the fluidic valve 150 reaches "the bypass fully opened," and this opening degree allows the cooling water to flow into the bypass passage 130. Then, after the driving of the pump 140 is started, the opening degree of the fluidic valve 150 reaches "the bypass fully opened" and the zero point adjustment is implemented and also the generation of electric power by a fuel cell 100 is started.

Fourteenth Embodiment

Figure 17:
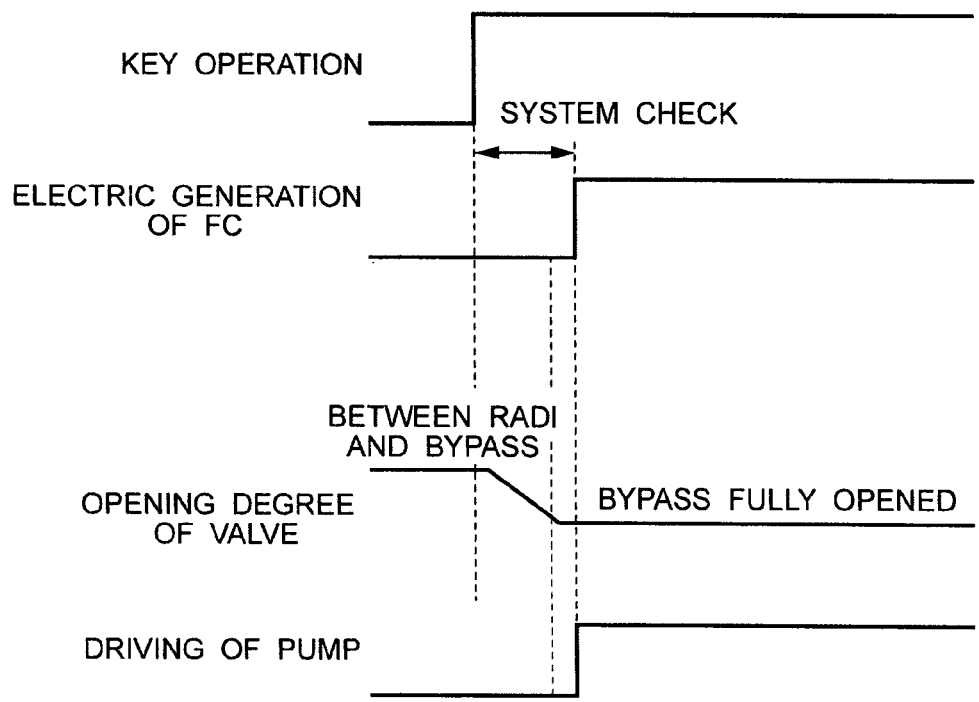
FIG. 17 is a time chart of a cooling apparatus for a fuel cell according to a fourteenth embodiment.

FIG. 17 shows a fourteenth embodiment of a cooling apparatus 101 in a fuel cell system 1, the fourteenth embodiment being a modification example of the eleventh embodiment. A different aspect from the eleventh embodiment is "the initial opening degree" of the fluidic valve 150, which is set to an opening degree at which the fluidic valve 150 allows cooling water to flow into both the radiator 110 and the bypass passage 130. For instance, when this example is applied to the rotary valve 500 of the tenth embodiment, the opening degree of the rotary valve 500 is as shown in FIG. 13 (*c*). This makes it possible to promptly accomplish the zero point adjustment to "the bypass fully opened," as described above.

Regarding the "initial opening degree" in the present embodiment, the opening degree of the fluidic valve 150 can be changed by design, as appropriate so as to, for example, give priority to either one of the radiator 110 and the bypass passage 130 into which the cooling water is to flow.

Fifteenth Embodiment

Figure 18:
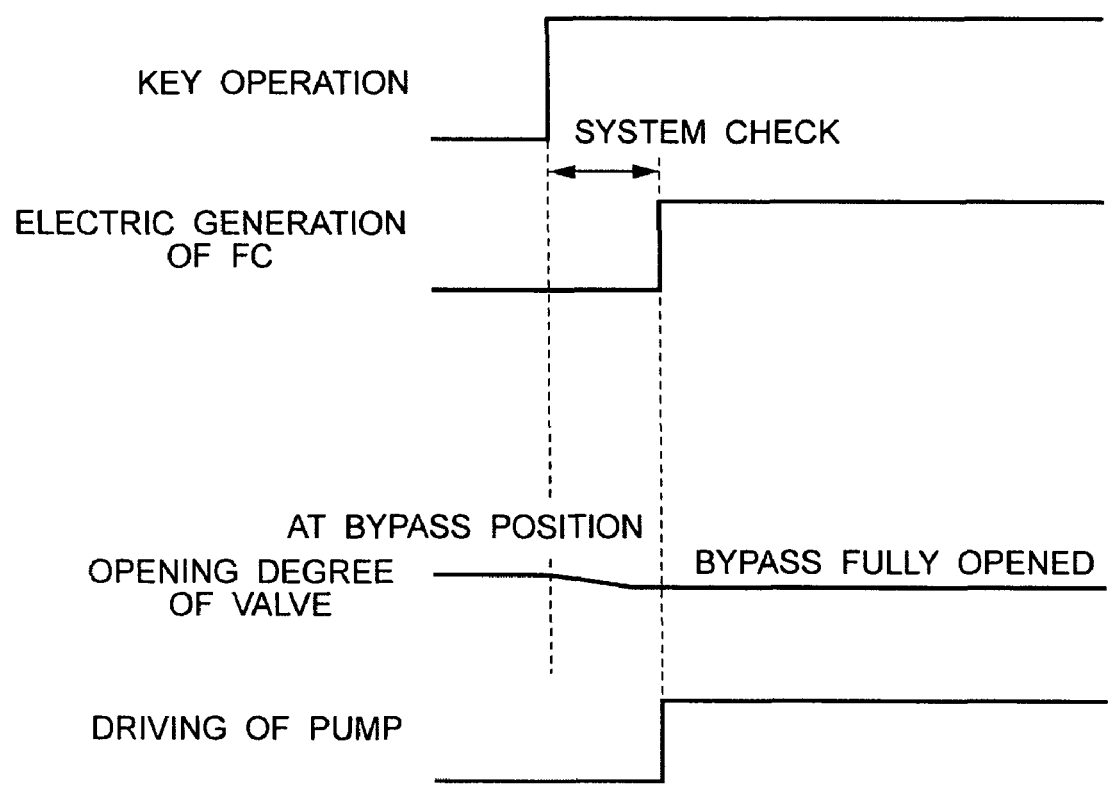
FIG. 18 is a time chart of a cooling apparatus for a fuel cell according to a fifteenth embodiment.

FIG. 18 shows a fifteenth embodiment of a cooling apparatus 101 in a fuel cell system 1, the fifteenth embodiment being a modification example of the eleventh embodiment. A different aspect from the eleventh embodiment is "the initial opening degree" of the fluidic valve 150. To be specific, "the initial opening degree" is set to an opening degree before reaching "the bypass fully opened," and at this opening degree, the fluidic valve 150 shuts off the flow of cooling water to the radiator 110, while allowing the flow of the cooling water into the bypass passage 130 at the same time. This permits quicker zero point adjustment to "the bypass fully opened" than in the fourteenth embodiment.

Sixteenth Embodiment

Figure 19:
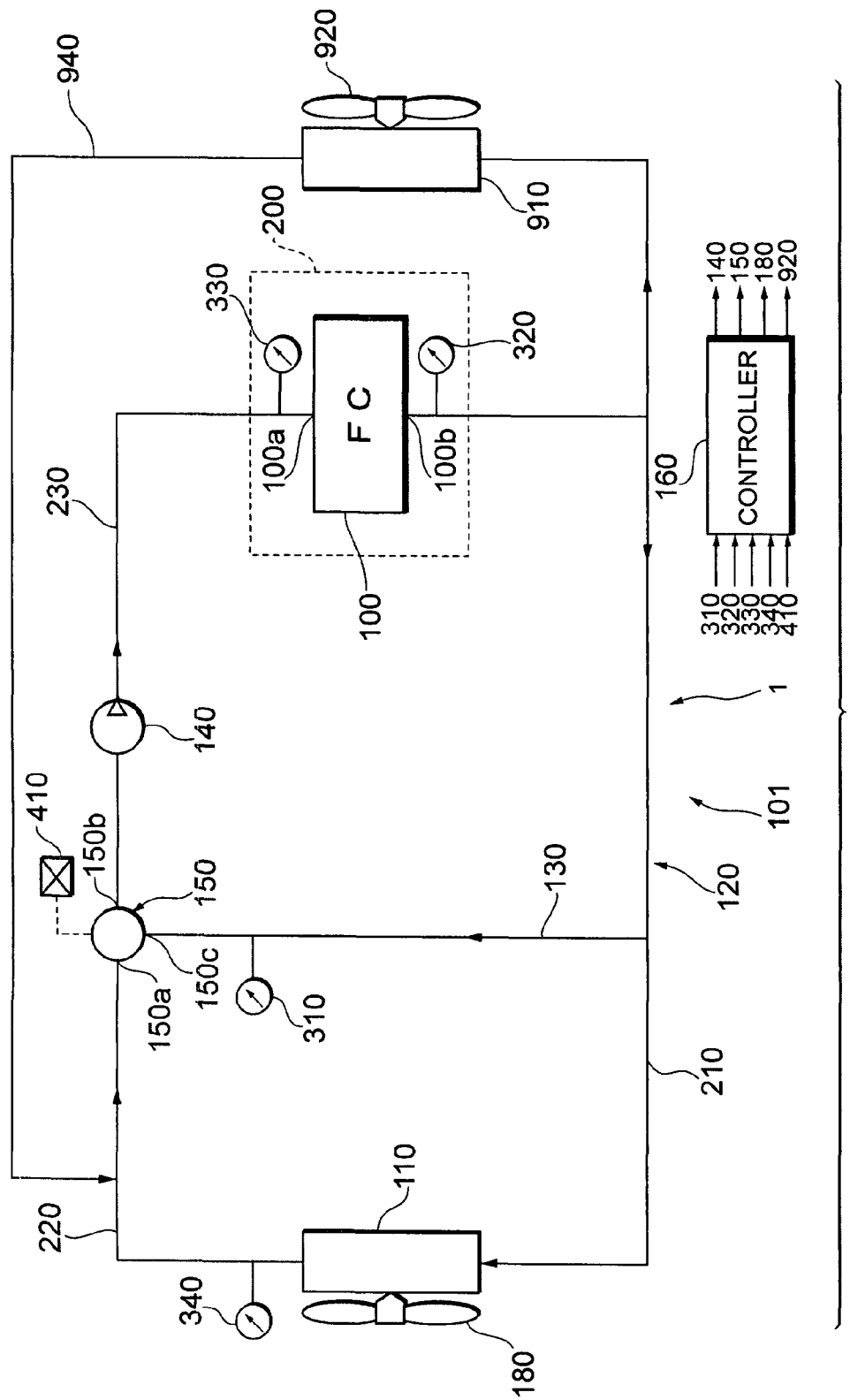
FIG. 19 is a configuration diagram showing a cooling apparatus for a fuel cell provided in a fuel cell system according to a sixteenth embodiment.

Referring now to FIG. 19, a cooling apparatus 101 in a fuel cell system 1 according to a sixteenth embodiment will be explained. The sixteenth embodiment is different from the eighth embodiment in that the position of the pump 140 has been changed onto a third passage 230 on the downstream side of a fluidic valve 150 and a second radiator 910 is provided as a sub radiator.

The second radiator 910 has the same construction as the aforesaid radiator 110 (hereinafter referred to as the first radiator), and has a fan 920 connected to a controller 160. The upstream end of a second circulation passage 940 provided with the second radiator 910 is branched and connected to a first passage 210, the connected position being at the upstream side of a bypass passage 130. The downstream end of the circulation passage 940 is branched and connected to a second passage 220 on the downstream side of the first radiator 110.

This configuration also causes cooling water to be supplied to a fuel cell 100, bypassing the first radiator 110 and the second radiator 910, when the fluidic valve 150 is switched to, for example, the bypass passage 130 side, such as "the bypass fully opened," so as to shut off the flow of the cooling water to the first radiator 110. Meanwhile, if the fluidic valve 150 is switched to, for example, the first radiator 110 side, such as "the radi fully opened," then the cooling water that has been cooled by the first radiator 110 and the cooling water that has been cooled by the second radiator 910 are passed through the fluidic valve 150 and supplied to the fuel cell 100.

The cooling apparatus 101 in the fuel cell system 1 according to the present embodiment also makes it possible to ideally restrain a temperature change in the fuel cell 100 when the fuel cell 100 is started up. Moreover, while the fuel cell 100 is generating electric power, the fuel cell 100 can be cooled further properly by the two radiators 110 and 910.

The invention claimed is:

1. A fuel cell system which circulates a refrigerant flowing into a fuel cell to cool the fuel cell and which is capable of heating air-conditioning gas in an air conditioning line by exhaust heat of the refrigerant that has passed through the fuel cell, the fuel cell system comprising:
    a cooling line which has a first heat exchanger for cooling the refrigerant and circulates the refrigerant to the fuel cell;
    an exhaust heat utilization line which has a second heat exchanger for heat exchanging the refrigerant with the air-conditioning gas in the air-conditioning line and which circulates the refrigerant to the fuel cell; and
    a flow controller programmed to control the flow of the refrigerant in the cooling line and the exhaust heat utilization line,
    wherein the flow controller is further programmed to start the flow of the refrigerant in the cooling line, before starting the flow of the refrigerant in the exhaust heat utilization line, thereby preventing refrigerant from entering the fuel cell when the refrigerant is at the temperature of the predetermined difference from that of the fuel cell.

2. The fuel cell system according to claim 1, further comprising:
    input means that enables a user to input an instruction for blowing air-conditioning gas of the air-conditioning line,
    wherein the flow controller is further programmed to control the flow of the refrigerant in the cooling line and the exhaust heat utilization line based on the input means.

3. The fuel cell system according to claim 2, wherein the flow controller is further programmed to start the flow of the refrigerant in the cooling line before the flow of the refrigerant in the exhaust heat utilization line if an input is supplied to the input means, while the flow controller is also programmed to shut off the flow of the refrigerant in the exhaust heat utilization line and to allow the refrigerant in the cooling line to flow if no input is supplied to the input means.

4. The fuel cell system according to claim 3, wherein the flow controller is further programmed to start the flow of the refrigerant in the exhaust heat utilization line after starting the flow of the refrigerant in the cooling line and to allow the refrigerant to flow for a predetermined time in the exhaust heat utilization line at a start-up of the fuel cell even if no input is supplied to the input means.

5. The fuel cell system according to claim 1, wherein the flow controller is further programmed to start the flow of the refrigerant in the exhaust heat utilization line after starting the flow of the refrigerant in the cooling line when starting-up the fuel cell.

6. The fuel cell system according to claim 5, further comprising:
    timer means for measuring time from a stop of the fuel cell to the next start-up,
    wherein the flow controller is further programmed to vary start time, at which the flow of the refrigerant in the exhaust heat utilization line is begun at the start-up of the fuel cell, based on the timer means.

7. The fuel cell system according to claim 5, further comprising:
    a temperature sensor for detecting the temperature of the refrigerant,
    wherein the flow controller is further programmed to vary start time, at which the flow of the refrigerant in the exhaust heat utilization line is begun at the start-up of the fuel cell, based on the temperature sensor.

8. The fuel cell system according to claim 1, wherein the flow controller is further programmed to cause the refrigerant to flow in at least one of the cooling line and the exhaust heat utilization line during an intermittent operation of the fuel cell.

9. The fuel cell system according to claim 8, wherein the flow controller is further programmed to start the flow of the refrigerant in the cooling line before the flow of the refrigerant in the exhaust heat utilization line during the intermittent operation of the fuel cell.

10. The fuel cell system according to claim 1, wherein the flow controller is further programmed to stop the flow in the exhaust heat utilization line before the flow of the refrigerant in the cooling line when the fuel cell is stopped.

11. The fuel cell system according to claim 1, wherein the fuel cell system further comprises:
    a cooling pump for pressure-feeding the refrigerant in the cooling line;
    an exhaust heat utilization pump for pressure-feeding the refrigerant in the exhaust heat utilization line; and
    wherein the flow controller is further programmed to control the driving of the cooling pump and the exhaust heat utilization pump, wherein the controller is further programmed to start the driving of the cooling pump and then to start the driving of the exhaust heat utilization pump.

12. The fuel cell system according to claim 11, wherein the controller is further programmed to carry out flow rate control such that the flow rate of the refrigerant by the cooling pump is larger than the flow rate of the refrigerant by the exhaust heat utilization pump.

13. The fuel cell system according to claim 11, further comprising:
    a temperature sensor for detecting the temperature of the refrigerant,
    wherein the controller is further programmed to control the driving both of the cooling pump and the exhaust heat utilization pump based on the temperature sensor.

14. The fuel cell system according to claim 11, wherein
    the exhaust heat utilization line is connected to a point of branching from and a point of merging with the cooling line at a refrigerant outlet side of the fuel cell, and
    a check valve is further provided on the cooling line on the upstream side beyond the point of merging to block the flow of the refrigerant from the point of merging to the refrigerant outlet of the fuel cell.

15. The fuel cell system according to claim 1, wherein the fuel cell system further comprises:
a single pump for pressure-feeding the refrigerant in the cooling line and the exhaust heat utilization line; and
wherein the controller is further programmed to control the driving of the pump,
wherein the cooling line has the passage resistance set to be lower than that of the exhaust heat utilization line, so that the refrigerant of the cooling line starts to flow into the fuel cell before the refrigerant of the exhaust heat utilization line.

16. The fuel cell system according to claim 1, wherein the fuel cell system further comprises:
a single pump for pressure-feeding the refrigerant in the cooling line and the exhaust heat utilization line;
a switching valve for switching the flow of the refrigerants of the cooling line and the exhaust heat utilization line to the fuel cell; and
wherein the controller is further programmed to control the driving of the pump and the switching valve,
wherein, when starting the flow of the refrigerant of the exhaust heat utilization line to the fuel cell, the control means changes the switching valve over to the cooling line to start the flow of the refrigerant of the cooling line to the fuel cell.

17. The fuel cell system according to claim 1, wherein the cooling line and the exhaust heat utilization line include a confluence for merging the refrigerant at a refrigerant inlet side of the fuel cell and also include a branch point for branching the refrigerant at a refrigerant outlet side of the fuel cell.

18. A fuel cell system which circulates a refrigerant flowing in a fuel cell to cool the fuel cell and which is capable of heating air-conditioning gas in an air conditioning line by exhaust heat of the refrigerant that has passed through the fuel cell, the fuel cell system comprising:
a cooling line which has a first heat exchanger for cooling the refrigerant and circulates the refrigerant to the fuel cell
an exhaust heat utilization line which has a second heat exchanger for heat exchanging the refrigerant with the air-conditioning gas in the air-conditioning line and which circulates the refrigerant to the fuel cell; and
a flow controller programmed to control the flow of the refrigerant in the cooling line and the exhaust heat utilization line,
wherein the flow controller is further programmed to carry out flow rate control such that the flow rate of the refrigerant of the cooling line is larger than that of the exhaust heat utilization line when the refrigerants of the cooling line and the exhaust heat utilization line are merged and passed through the fuel cell, thereby preventing refrigerant cell from entering the fuel cell when the refrigerant is at the temperature of the predetermined difference from that of the fuel cell.

19. A fuel cell system which circulates the refrigerant flowing in a fuel cell to cool the fuel cell and which is capable of heating air-conditioning gas in an air conditioning line by exhaust heat of the refrigerant that has passed through the fuel cell, the fuel cell system comprising:
a cooling line which has a first heat exchanger for cooling the refrigerant and circulates the refrigerant to the fuel cell;
an exhaust heat utilization line which has a second heat exchanger for heat-exchanging the refrigerant with the air-conditioning gas in the air-conditioning line and which merges with the cooling line at a refrigerant inlet side of the fuel cell and branches from the cooling line at a refrigerant outlet side of the fuel cell;
a bypass line through which the refrigerant flows to bypass the fuel cell; and
a flow controller programmed to control the flow of the refrigerant in the cooling line, the exhaust heat utilization line, and the bypass line,
wherein the flow controller is further programmed to cause the refrigerant to flow in the bypass line and mixes the refrigerants of the cooling line and the exhaust heat utilization line, then circulates the refrigerant to the fuel cell, shutting off the flow of the refrigerant in the bypass line, thereby preventing refrigerant from entering the fuel cell, when the refrigerant is at the temperature of the predetermined difference from that of the fuel cell.

* * * * *